US008702822B2

(12) United States Patent
Bhan et al.

(10) Patent No.: US 8,702,822 B2
(45) Date of Patent: Apr. 22, 2014

(54) METHOD AND APPARATUS FOR PRODUCING A FUEL FROM A BIOMASS OR BIO-OIL

(75) Inventors: Aditya Bhan, Minneapolis, MN (US); Michael Tsapatsis, Minneapolis, MN (US); Lanny D. Schmidt, Minneapolis, MN (US); Paul J. Dauenhauer, Sunderland, MA (US)

(73) Assignee: Regents of the University of Minnesota, St. Paul, MN (US)

( * ) Notice: Subject to any disclaimer, the term of this patent is extended or adjusted under 35 U.S.C. 154(b) by 715 days.

(21) Appl. No.: 12/871,187

(22) Filed: Aug. 30, 2010

(65) Prior Publication Data

US 2011/0047864 A1 Mar. 3, 2011

Related U.S. Application Data

(60) Provisional application No. 61/237,836, filed on Aug. 28, 2009.

(51) Int. Cl.
*C10L 1/02* (2006.01)
*C10G 1/06* (2006.01)
*B01J 29/06* (2006.01)

(52) U.S. Cl.
USPC ............. 44/605; 44/606; 585/14; 585/240; 585/242; 208/65; 208/134

(58) Field of Classification Search
USPC ............. 44/307, 605, 606; 585/240–242, 14; 208/9, 62–66, 71, 133–138; 502/4; 422/631, 632, 633
See application file for complete search history.

(56) References Cited

U.S. PATENT DOCUMENTS

| 4,253,302 | A |   | 3/1981 | Asano et al.      |         |
|-----------|---|---|--------|-------------------|---------|
| 4,568,595 | A |   | 2/1986 | Morris            |         |
| 4,992,605 | A | * | 2/1991 | Craig et al.      | 585/240 |
| 5,110,478 | A | * | 5/1992 | Haag et al.       | 210/650 |
| 5,504,259 | A | * | 4/1996 | Diebold et al.    | 568/697 |
| 5,895,769 | A | * | 4/1999 | Lai               | 502/4   |
| 5,959,167 | A | * | 9/1999 | Shabtai et al.    | 585/242 |
| 6,225,359 | B1| * | 5/2001 | O'Rear et al.     | 518/706 |
| 7,255,848 | B2| * | 8/2007 | Deluga et al.     | 423/648.1 |

(Continued)

FOREIGN PATENT DOCUMENTS

WO   WO 2008/109129 A2   9/2008
WO   WO 2008/109129 A3   10/2008

OTHER PUBLICATIONS

Aghalayam et al., "Construction and optimization of complex surface-reaction mechanisms," *AICHE Journal: Reactors, Kinetics, and Catalysis*, Oct. 2000; 46(10): 2017-29. Available online Apr. 16, 2004.

(Continued)

*Primary Examiner* — Nina Bhat
*Assistant Examiner* — Jonathan Miller
(74) *Attorney, Agent, or Firm* — Mueting, Raasch & Gebhardt, P.A.

(57) ABSTRACT

Methods and reactors for producing a fuel are disclosed herein. In some embodiments, the method uses a biomass feedstock and alkane and/or alcohol feedstock, which can be contacted with a metal-containing catalyst to form products including a bio-oil. In some embodiments, oxygen-containing functional groups can be removed from a bio-oil using one or more zeolite thin films.

28 Claims, 15 Drawing Sheets

(56) References Cited

U.S. PATENT DOCUMENTS

| | | | | |
|---|---|---|---|---|
| 7,357,836 | B2* | 4/2008 | Tsapatsis et al. | 117/68 |
| 7,390,347 | B2* | 6/2008 | Kusakabe et al. | 95/45 |
| 7,442,290 | B2* | 10/2008 | Shan et al. | 208/46 |
| 7,442,365 | B1* | 10/2008 | Jacobsen et al. | 423/700 |
| 7,534,372 | B2* | 5/2009 | Schmidt et al. | 252/373 |
| 7,550,634 | B2* | 6/2009 | Yao et al. | 585/240 |
| 7,678,950 | B2* | 3/2010 | Yao et al. | 585/240 |
| 7,905,931 | B2* | 3/2011 | Woods et al. | 44/308 |
| 7,998,339 | B2* | 8/2011 | Myllyoja et al. | 208/18 |
| 8,017,818 | B2* | 9/2011 | Cortright et al. | 585/240 |
| 8,212,093 | B2* | 7/2012 | Datta et al. | 585/240 |
| 8,349,289 | B2* | 1/2013 | Schmidt et al. | 423/650 |
| 2002/0003102 | A1* | 1/2002 | O'Rear et al. | 208/18 |
| 2003/0168407 | A1* | 9/2003 | Kusakabe et al. | 210/650 |
| 2005/0202956 | A1* | 9/2005 | Sterte et al. | 502/64 |
| 2008/0237542 | A1* | 10/2008 | Schmidt et al. | 252/373 |
| 2009/0326279 | A1* | 12/2009 | Tonkovich et al. | 568/487 |
| 2010/0200810 | A1* | 8/2010 | Schmidt et al. | 252/373 |
| 2011/0046423 | A1* | 2/2011 | Sughrue et al. | 585/240 |
| 2011/0313219 | A1* | 12/2011 | Fernando et al. | 585/240 |

OTHER PUBLICATIONS

Agrawal et al., "Sustainable fuel for the transportation sector," *Proc. Natl. Acad. Sci. USA*, Mar. 20, 2007; 104(12): 4828-33. Available online Mar. 14, 2007.

Aho et al., "Catalytic pyrolysis of woody biomass in a fluidized bed reactor: Influence of the zeolite structure," *Fuel*, Sep. 2008; 87(12): 2493-501. Available online Mar. 14, 2008.

Benco et al., "Physisorption and chemisorption of some n-Hydrocarbons at the BrØnsted Acid Site in Zeolites 12-Membered Ring Main Channels: Ab Initio Study of the Gmelinite Structure," *J Phys. Chem. B*, 2003; 107(36): 9756-62. Available online Aug. 12, 2003.

U.S. Appl. No. 61/172,325, filed Apr. 24, 2009, Bhan et al.

Bhan et al., "DFT Investigation of Alkoxide Formation from Olefins in H-ZSM-5," *J. Phys. Chem. B*, 2003; 107(38): 10476-87. Available online Sep. 3, 2003.

Bhan et al., "Specificity of sites within eight-membered ring zeolite channels for carbonylation of methyls to acetyls," *J. Am. Chem. Soc.*, Apr. 25, 2007; 129(16): 4919-24. Available online Mar. 31, 2007.

Bhan et al., "A link between reactivity and local structure in acid catalysis on zeolites," *Acc. Chem. Res.*, Apr. 2008; 41(4): 559-67. Available online Feb. 16, 2008.

Biscardi et al., "Non-oxidative reactions of propane on Zn/Na-ZSM5," *Phys. Chem. Chem. Phys.*, 1999;1(24): 5753-9.

Biscardi et al., "Reaction Pathways and Rate-Determining Steps in Reactions of Alkanes on H-ZSM5 and Zn/H-ZSM5 Catalysts," *Journal of Catalysis*, Feb. 15, 1999; 182(1): 117-28. Available online Apr. 1, 2002.

Blaszkowski et al., "Density Functional Theory Calculations of the Transition States for Hydrogen Exchange and Dehydrogenation of Methane by a Broensted Zeolitic Proton," *J. Phys. Chem.*, Dec. 1994; 98(49): 12938-44.

Blaszkowski et al., "The Mechanism of Dimethyl Ether Formation from Methanol Catalyzed by Zeolitic Protons," *J. Am. Chem. Soc.*, 1996; 118(21): 5152-3.

Blaszkowski et al., "Theoretical Study of the Mechanism of Surface Methoxy and Dimethyl Ether Formation from Methanol Catalyzed by Zeolitic Protons," *J. Phys. Chem. B*, 1997; 101(13): 2292-305. Available online Mar. 27, 1997.

Boronat et al., "A Theoretical Study of the Mechanism of the Hydride Transfer Reaction between Alkanes and Alkenes Catalyzed by an Acidic Zeolite," *J Phys. Chem. A*, 1998; 102(48): 9863-8. Available online Oct. 30, 1998.

Boronat et al., "Theoretical Study of Bimolecular Reactions between Carbenium Ions and Paraffins: The Proposal of a Common Intermediate for Hydride Transfer, Disproportionation, Dehydrogenation, and Alkylation," *J. Phys. Chem. B*, 1999; 103(37): 7809-21. Available online Aug. 25, 1999.

Boronat et al., "Ab Initio and density-functional theory study of zeolite-catalyzed hydrocarbon reactions: hydride transfer, alkylation and disproportionation," *Phys. Chem. Chem. Phys.*, 2000; 2(14): 3327-33. Available online Jun. 15, 2000.

Boronat et al., "Enzyme-like specificity in zeolites: A unique site position in mordenite for selective carbonylation of methanol and dimethyl ether with CO," *J Am. Chem. Soc.*, Dec. 3, 2008; 130(48): 16316-23.

Brändle et al., "Acidity Differences Between Inorganic Solids Induced by Their Framework Structure. A Combined Quantum Mechanics/Molecular Mechanics ab Initio Study on Zeolites," *J Am. Chem. Soc.*, Feb. 1, 1998; 120(7): 1556-70.

Brändle et al., "Comparison of a combined quantum mechanics/interatomic potential function approach with its periodic quantum-mechanical limit: Proton siting and ammonia adsorption in zeolite chabazite," *J. Chem. Phys.*, Dec. 15, 1998; 109(23): 10379-89.

Bridgwater, "Catalysis in thermal biomass conversion," *Applied Catalysis A: General*, Sep. 1994; 116(1-2): 5-47. Available online Aug. 27, 2001.

Bryant et al., "Dehydration of alcohols over zeolite catalysts," *Journal of Catalysis*, May 1967; 8(1): 8-13.

Bučko et al., "Proton exchange of small hydrocarbons over acidic chabazite: Ab initio study of entropic effects," *Journal of Catalysis*, Aug. 15, 2007; 250(1): 171-83. Available online Jul. 12, 2007.

Carlson et al., "Green Gasoline by Catalytic Fast Pyrolysis of Solid Biomass Derived Compounds," *ChemSusChem*, 2008; 1(5): 397-400.

Carlson et al., "Aromatic Production from Catalytic Fast Pyrolysis of Biomass-Derived Feedstocks," *Topics in Catalysis*, 2009; 52(3): 241-52.

Chatterjee et al., "Systems tasks in nanotechnology via hierarchical multiscale modeling: Nanopattern formation in heteroepitaxy," *Chemical Engineering Science*, Sep.-Oct. 2007; 62(18-20): 4852-63. Available online Jan. 13, 2007.

Chen et al., "Liquid fuel from carbohydrates," *Chemtech*, 1986; 16(8): 506-11.

Cheung et al., "Site requirements and elementary steps in dimethyl ether carbonylation catalyzed by acidic zeolites," *Journal of Catalysis*, Jan. 1, 2007; 245(1): 110-23. Available online Oct. 27, 2006.

Chiang et al., "Catalytic consequences of hydroxyl group location on the rate and mechanism of parallel dehydration reactions of ethanol over acidic zeolites," *Journal of Catalysis*, May 4, 2010; 271(2): 251-61.

Choi et al., "Amphiphilic organosilane-directed synthesis of crystalline zeolite with tunable mesoporosity," *Nature Materials*, Sep. 2006; 5: 718-723. Available online Aug. 6, 2006.

Christensen et al., "Mesoporous zeolite single crystal catalysts: Diffusion and catalysis in hierarchical zeolites," *Catalysis Today*, Oct. 30, 2007; 128(3-4): 117-22. Available online Aug. 17, 2007.

Colby et al., "Millisecond autothei ural steam reforming of cellulose for synthetic biofuels by reactive flash volatilization," *Green Chemistry*, 2008; 10(7): 773-83. Available online Jun. 2, 2008.

Corma et al., "Cracking Behavior of Zeolites with Connected 12- and 10-Member Ring Channels: The Influence of Pore Structure on Product Distribution," *Journal of Catalysis*, Apr. 15, 1997; 167(2): 438-46.

Corma et al., "On the Limitations to Establish the Contribution of the Different Reaction Mechanisms from Selectivity Data, During Cracking of Long-Chain Linear Paraffins," *Ind. Eng. Chem. Res.*, 1997; 36(8): 3400-15. Available online Aug. 4, 1997.

Corma, "Sorption, diffusion and catalytic properties of zeolites containing 10- and 12-member ring pores in the same structure," *Microporous and Mesoporous Materials*, May 1998; 21(4-6): 487-95.

Corma et al., "Processing biomass-derived oxygenates in the oil refinery: Catalytic cracking (FCC) reaction pathways and role of catalyst," *Journal of Catalysis*, Apr. 25, 2007; 247(2): 307-27. Available online Mar. 26, 2007.

Correa et al., "Theoretical study of protonation of butene isomers on acidic zeolite: the relative stability among primary, secondary and tertiary alkoxy intermediates," *Phys. Chem. Chem. Phys.*, 2002; 4(2): 375-80. Available online Jan. 3, 2002.

(56) References Cited

OTHER PUBLICATIONS

Cortright et al., "Hydrogen from catalytic reforming of biomass-derived hydrocarbons in liquid water," *Nature*, Aug. 29, 2002; 418(6901): 964-7.
Cote et al., "Investigation of spatially patterned catalytic reactors," *Chemical Engineering Science*, Jul. 1999; 54(13-14): 2627-35. Available online Jun. 9, 1999.
Czernik et al., "Overview of Applications of Biomass Fast Pyrolysis Oil," *Energy and Fuels*, 2004; 18(2): 590-8. Available online Feb. 26, 2004.
Dauenhauer et al., "Millisecond Reforming of Solid Biomass for Sustainable Fuels," *Angew. Chem. Int. Ed.*, Aug. 3, 2007; 46(31): 5864-7. Available online Jul. 3, 2007.
Dauenhauer, "Millisecond autothermal catalytic reforming of carbohydrates for synthetic fuels by reactive flash volatilization," Ph.D. Thesis, University of Minnesota. Submitted Aug. 2008, available online Mar. 2010, available publicly May 13, 2010.
Davda et al., "A review of catalytic issues and process conditions for renewable hydrogen and alkanes by aqueous-phase reforming of oxygenated hydrocarbons over supported metal catalysts," *Applied Catalysis B: Environmental*, Mar. 10, 2005; 56(1-2): 171-86. Available online Oct. 12, 2004.
de Moor et al., "Si-MFI Crystallization Using a 'Dimer' and 'Trimer' of TPA Studied with Small-Angle X-ray Scattering," *J. Phys. Chem. B*, 2000; 104(32): 7600-11. Available online Jul. 22, 2000.
Deluga et al., "Renewable Hydrogen from Ethanol by Autothermal Reforming," *Science*, Feb. 13, 2004; 303(5660): 993-7.
Deshmukh et al., "Microreactor Modeling for Hydrogen Production from Ammonia Decomposition on Ruthenium," *Ind. Eng. Chem. Res.*, 2004; 43(12): 2986-99. Available online Feb. 6, 2004.
Deshmukh et al., "From Density Functional Theory to Microchemical Device Homogenization: Model Prediction of Hydrogen Production for Portable Fuel Cells," *Int. J Mult. Comp. Eng.*, 2004; 2(2): 221-38.
Deshmukh et al., "A reduced mechanism for methane and one-step rate expressions for fuel-lean catalytic combustion of small alkanes on noble metals," *Combust. Flame*, 2007; 149(4): 366-83. Available online Apr. 27, 2007.
Fan et al., "Hierarchical nanofabrication of microporous crystals with ordered mesoporosity," *Nature Materials*, 2008; 7(12): 984-91. Available online Oct. 26, 2008.
Fermann et al., "Modeling proton mobility in acidic zeolite clusters. I. Convergence of transition state parameters from quantum chemistry," *J. Chem. Phys.*, 2000; 112(15): 6779-86.
Fermann et al., "Modeling proton mobility in acidic zeolite clusters: II. Room temperature tunneling effects from semiclassical rate theory," *J. Chem. Phys.*, 2000; 112(15): 6787-94.
Frash et al., "Cracking of Hydrocarbons on Zeolite Catalysts: Density Functional and Hartree Fock Calculations on the Mechanism of the β-Scission Reaction," *J. Phys. Chem. B*, 1998; 102(12): 2232-38. Available online Feb. 28, 1998.
Frillette et al., "Catalysis by crystalline aluminosilicates: Characterization of intermediate pore-size zeolites by the 'Constraint Index,'" *Journal of Catalysis*, Jan. 1981; 67(1): 218-22.
Fukuoka et al., "Catalytic Conversion of Cellulose into Sugar Alcohols," *Angew. Chem. Int. Ed.*, Aug. 4, 2006; 45(31): 5161-3. Available online Jul. 6, 2006.
Gayubo et al., "Transformation of Oxygenate Compounds of Biomass Pyrolysis Oil on a HZSM-5 Zeolite. I. Alcohols and Phenols," *Ind. Eng. Chem. Res.*, 2004; 43(11): 2610-18. Available online May 1, 2004.
Gayubo et al., "Transformation of Oxygenate Components of Biomass Pyrolysis Oil on a HZSM-5 Zeolite. II. Aldehydes, Ketones and Acids," *Ind. Eng. Chem. Res.*, 2004, 43(11): 2619-26. Available online May 1, 2004.
Gayubo et al., "Undesired components in the transformation of biomass pyrolysis oil into hydrocarbons on an HZSM-5 zeolite catalyst," *J. Chem. Tech. Biotech.*, Nov. 2005; 80(11): 1244-51. Available online May 26, 2005.

Gounaris et al., "Rational design of shape selective separation and catalysis—I: Concepts and analysis," *Chemical Engineering Science*, Dec. 2006; 61(24): 7933-48. Available online Sep. 12, 2006.
Gounaris et al., "Rational design of shape selective separation and catalysis—II: Mathematical model and computational studies," *Chemical Engineering Science*, Dec. 2006; 61(24): 7949-62. Available online Sep. 10, 2006.
Hildebrant et al., "Producing Transportation Fuels with Less Work," *Science*, Mar. 27, 2009; 323(5922): 1680-1.
Horn et al., "Spatial and temporal profiles in millisecond partial oxidation processes," *Catalysis Letters*, Sep. 2006; 110(3-4): 169-78.
Huber et al., "Raney-Ni—Sn Catalyst for $H_2$ Production from Biomass-Derived Hydrocarbons," *Science*, Jun. 27, 2003; 300(5628): 2075-77.
Huber et al., "Renewable Alkanes by Aqueous-Phase Reforming of Biomass-Derived Oxygenates," *Angew. Chem. Int. Ed.*, Mar. 12, 2004; 43(12): 1549-51. Available online Mar. 9, 2004.
Huber et al., "Production of Liquid Alkanes by Aqueous-Phase Processing of Biomass-Derived Carbohydrates," *Science*, Jun. 3, 2005; 308(5727): 1446-50.
Huber et al., "Synthesis of Transportation Fuels from Biomass: Chemistry, Catalysts, and Engineering," *Chemical Reviews*, 2006; 106(9): 4044-98. Available online Jun. 27, 2006.
Huber et al., "An overview of aqueous-phase catalytic processes for production of hydrogen and alkanes in a biorefinery," *Catalysis Today*, Jan. 15, 2006; 111(1-2): 119-32. Available online Nov. 16, 2005.
Huber et al., "Synergies between bio- and oil refineries for the production of fuels from biomass," *Angew. Chem. Int. Ed.*, 2007; 46(38): 7184-201.
Huber et al., "Processing biomass in conventional oil refineries: Production of high quality diesel by hydrotreating vegetable oils in heavy vacuum oil mixtures," *Applied Catalysis A-General*, Oct. 1, 2007; 329: 120-9. Available online Jul. 7, 2007.
Janik et al., "A density functional theory study of the alkylation of isobutane with butene over phosphotungstic acid," *Journal of Catalysis*, Nov. 15, 2006; 244(1): 65-77. Available online Sep. 28, 2006.
Joshi et al., "DFT-Based Reaction Pathway Analysis of Hexadiene Cyclization via Carbenium Ion Intermediates: Mechanistic Study of Light Alkane Aromatization Catalysis," *J. Phys. Chem. B*, 2004; 108(3): 971-80. Available online Dec. 24, 2003.
Joshi et al., "Embedded cluster (QM/MM) investigation of C6 diene cyclization in HZSM-5," *Journal of Catalysis*, Mar. 10, 2005; 230(2): 440-63. Available online Feb. 5, 2005.
Kaisare et al., "Extending the region of stable homogenous microcombustion through forced unsteady operation," *Proceedings of the Combustion Institute*, Jan. 2007; 31(2): 3293-300. Available online Aug. 7, 2006.
Kaisare et al., "Optimal reactor dimensions for homogenous combustion in small channels," *Catalysis Today*, Jan. 30, 2007; 120(1): 96-106. Available online Aug. 23, 2006.
Kaisare et al., "Millisecond Production of Hydrogen from Alternative, High Hydrogen Density Fuels in a Cocurrent Multifunctional Microreactor," *Ind. Eng. Chem. Res.*, 2009; 48(4): 1749-60. Available online Jan. 12, 2009.
Kandoi et al., "Prediction of Experimental Methanol Decomposition Rates on Platinum from First Principles," *Topics in Catalysis*, Mar. 2006; 37(1): 17-28.
Kandoi, *Catalytic Hydrogen Production and Chemistry on Transition Metals*, Ph.D. Dissertation, University of Wisconsin—Madison, submitted 2006, available Jun. 2007; 210 pages.
Kazansky et al, "On the real nature of aliphatic carbenium ions as active intermediates of homogenous and heterogenous acid catalysis," *Journal of Molecular Catalysis*, Jul.-Aug. 1992, 74(1-3): 257-66. Available online Sep. 17, 2001.
Kazansky et al., "A quantum-chemical study of adsorbed nonclassical carbonium ions as active intermediates in catalytic transformations of paraffins. II. Protolytic dehydrogenation and hydrogen-deuterium hetero-isotope exchange of paraffins on high-silica zeolites," *Catalysis Letters*, 1994; 28: 211-22.
Kazansky et al., "Quantumchemical study of the isobutane cracking on zeolites," *Applied Catalysis A: General*, Oct. 22, 1996; 146(1): 225-47.

(56) References Cited

OTHER PUBLICATIONS

Kazansky et al., "A quantum-chemical study of hydride transfer in catalytic transformations of paraffins on zeolites. Pathways through adsorbed nonclassical carbonium ions," *Catalysis Letters*, 1997; 48: 61-7.
Kazansky, "Adsorbed carbocation as transition states in heterogeneous acid catalyzed transformations of hydrocarbons," *Catalysis Today*, Jul. 1999; 51(3-4): 419-34. Available online Jun. 2, 1999.
Kunkes et al., "Catalytic Conversion of Biomass to Monofunctional Hydrocarbons and Targeted Liquid-Fuel Classes," *Science*, Oct. 17, 2008; 322(5900): 417-21. Available online Sep. 18, 2008.
Lange, "Lignocellulose conversion: an introduction to chemistry, process and economics," *Biofuels, Bioproducts and Biorefining*, Sep. 2007; 1(1): 39-48. Available online Jul. 18, 2007.
Lew et al., "Zeolite thin films: from computer chips to space stations," *Accounts of Chemical Research*, Feb. 16, 2010; 43(2): 210-19.
Maestri et al., "Steam and dry reforming of methane on Rh: Microkinetic analysis and hierarchy of kinetic models," *Journal of Catalysis*, Oct. 25, 2008; 259(2): 211-22. Available online Sep. 25, 2008.
Maheshwari et al., "Layer structure preservation during swelling, pillaring, and exfoliation of a zeolite precursor," *J. Am. Chem. Soc.*, Jan. 30, 2008; 130(4): 1507-16. Available online Jan. 8, 2008.
Mhadeshwar et al, "The role of adsorbate-adsorbate interactions in the rate controlling step and most abundant reaction intermediate of $NH_3$ decomposition on Ru," *Catalysis Letters*, Jul. 2004; 96(1-2): 13-22.
Mhadeshwar et al., "Microkinetic Modeling for Water-Promoted CO Oxidation, Water Gas Shift, and Preferential Oxidization of CO on Pt," *J. Phys. Chem. B*, 2004; 108(39): 15246-58. Available online Aug. 26, 2004.
Mhadeshwar et al., "A thermodynamically consistent surface reaction mechanism for CO oxidation on Pt," *Combust. Flame*, Aug. 2005; 142(3): 289-98. Available online May 3, 2005.
Mhadeshwar et al., "Hierarchical multiscale mechanism development for methane partial oxidation and reforming and for thermal decomposition of oxygenates on Rh," *J. Phys. Chem. B*, Sep. 8, 2005; 109(35): 16819-35.
Mhadeshwar et al., "A Catalytic Reaction Mechanism for Methane Partial Oxidation at Short Contact Times, Reforming, and Combustion, and for Oxygenate Decomposition and Oxidation on Platinum," *Ind. Eng. Chem. Res.*, 2007; 46(16): 5310-24. Available online Jul. 11, 2007.
Milas et al., "A density-functional study of the dehydrogenation reaction of isobutane over zeolites," *Chemical Physics Letters*, Apr. 13, 2001; 338(1): 67-73.
Milas et al., "The dehydrogenation and cracking reactions of isobutane over the ZSM-5 zeolite," *Chemical Physics Letters*, May 2003; 373(3-4): 379-384.
Natal-Santiago et al., "DFT Study of the Isomerization of Hexyl Species Involved in the Acid-Catalyzed Conversion of 2-Methyl-Pentene-2," *Journal of Catalysis*, Jan. 1, 1999; 181(1): 124-44.
National Science Foundation. Chemical, Bioengineering, Environmental, and Transport Systems Division, *Breaking the Chemical and Engineering Barriers to Lignocellulosic Biofuels: Next Generation Hydrocarbon Biorefineries*, eds. Huber, Washington D.C., Mar. 2008. Part 1. 91 pgs.
National Science Foundation. Chemical, Bioengineering, Environmental, and Transport Systems Division, *Breaking the Chemical and Engineering Barriers to Lignocellulosic Biofuels: Next Generation Hydrocarbon Biorefineries*, eds. Huber, Washington D.C., Mar. 2008. Part 2. 89 pgs.
Nogare et al., "Modeling spatially resolved profiles of methane partial oxidation on a Rh foam catalyst with detailed chemistry," *Journal of Catalysis*, Aug. 15, 2008; 258(1): 131-42. Available online Jul. 10, 2008.
Pérez-Ramirez et al., "Hierarchical zeolites: enhanced utilisation of microporous crystals in catalysis by advances in materials design," *Chem. Soc. Rev.*, Nov. 2008; 37(11): 2530-42. Available online Sep. 18, 2008.

Petrus et al., "Biomass to biofuels, a chemical perspective," *Green Chemistry*, 2006; 8(10): 861-7. Available online Aug. 15, 2006.
Piskorz et al., "Pretreatment of wood and cellulose for production of sugars by fast pyrolysis," *Journal of Analytical and Applied Pyrolysis*, Jun. 1989; 16(2): 127-42.
Prasad et al., "Assessment of Overall Rate Expressions and Multiscale, Microkinetic Model Uniqueness via Experimental Data Injection: Ammonia Decomposition on $Ru/\gamma-Al_2O_3$ for Hydrogen Production," *Ind. Eng. Chem. Res.*, 2009; 48(11): 5255-65. Available online Apr. 27, 2009.
Prasad et al., "High throughput multiscale modeling for design of experiments, catalysts, and reactors: Application to hydrogen production from ammonia," *Chemical Engineering Science*, 2010; 65(1): 240-6. Available online Jun. 21, 2009.
Ragauskas et al., "The Path Forward for Biofuels and Biomaterials," *Science*, Jan. 27, 2006; 311(5760): 484-9.
Raimondeau et al., "Recent developments on multiscale, hierarchical modeling of chemical reactors," *Chemical Engineering Journal*, Nov. 28, 2002; 90(1-2): 3-23. Available online May 22, 2002.
Ranjan et al., "Adsorption of fermentation inhibitors from lignocellulosic biomass hydrolyzates for improved ethanol yield and value-added product recovery," *Microporous and Mesoporous Materials*, Jun. 1, 2009; 122(1-3): 143-8. Available online Feb. 21, 2009.
Rigby et al., "Mechanisms of Hydrocarbon Conversion in Zeolites: A Quantum Mechanical Study," *Journal of Catalysis*, Aug. 1997; 170(1): 1-10.
Román-Leshkov et al., "Production of dimethylfuran for liquid fuels from biomass-derived carbohydrates," *Nature*, Jun. 21, 2007; 447(7147): 982-5.
Rozanska et al., "A DFT Study of Isomerization and Transalkylation Reactions of Aromatic Species Catalyzed by Acidic Zeolites," *Journal of Catalysis*, Aug. 15, 2001; 202(1): 141-55.
Rozanska et al., "A Periodic Structure Density Functional Theory Study of Propylene Chemisorption in Acidic Chabazite: Effect of Zeolite Structure Relaxation," *J. Phys. Chem. B*, 2002; 106(12): 3248-54. Available online Mar. 6, 2002.
Rozanska et al., "A Periodic DFT Study of Isobutene Chemisorption in Proton-Exchanged Zeolites: Dependence of Reactivity on the Zeolite Framework Structure," *J Phys. Chem. B*, 2003; 107(6): 1309-15. Available online Jan. 21, 2003.
Salge et al., "Catalytic partial oxidation of ethanol over noble metal catalysts," *Journal of Catalysis*, Oct. 1, 2005; 235: 69-78. Available online Aug. 19, 2005.
Salge et al., "Renewable Hydrogen From Nonvolatile Fuels by Reactive Flash Volatilization," *Science*, Nov. 3, 2006; 314(5800): 801-4.
Shabaker et al., "Aqueous-phase reforming of methanol and ethylene glycol over alumina-supported platinum catalysts," *Journal of Catalysis*, Apr. 25, 2003; 215(2): 344-52. Available online Mar. 19, 2003.
Shustorovich, "The Bond-Order Conservation Approach to Chemisorption and Heterogeneous Catalysis: Applications and Implications," *Advances in Catalysis*, 1990; 37: 101-64.
Shustorovich et al., "The UBI-QEP method: A practical theoretical approach to understanding chemistry on transition metal surfaces," *Surface Science Reports*, 1998; 31(1-3): 1-119. Available online Sep. 10, 1998.
Simonetti et al., "Coupling of glycerol processing with Fischer-Tropsch synthesis for production of liquid fuels," *Green Chemistry*, 2007; 9(10): 1073-83.
Sinclair et al., "Quantum-chemical studies of alkene chemisorption in chabazite: a comparison of cluster and embedded-cluster models," *J. Chem. Soc., Faraday Trans.*, 1998; 94(22): 3401-8.
Snyder et al., "Hierarchical nanomanufacturing: from shaped zeolite nanoparticles to high-performance separation membranes," *Angew. Chem. Int. Ed.*, 2007; 46(40): 7560-73.
Srivastava et al., "Mesoporous materials with zeolite framework: remarkable effect of the hierarchical structure for retardation of catalyst deactivation," *Chemical Communications*, 2006; 4489-91. Available online Sep. 29, 2006.
Stöcker, "Biofuels and Biomass-To-Liquid Fuels in the Biorefinery: Catalytic Conversion of Lignocellulosic Biomass using Porous Materials," *Angew. Chem. Int. Ed.*, Nov. 17, 2008; 47(48): 9200-11. Available online Oct. 20, 2008.

(56) References Cited

OTHER PUBLICATIONS

Takanabe et al., "Sustainable hydrogen from bio-oil—Steam reforming of acetic acid as a model oxygenate," *Journal of Catalysis*, Oct. 1, 2004; 227(1): 101-8. Available online Jul. 29, 2004.

Takanabe et al., "Steam reforming of acetic acid as a biomass derived oxygenate: Bifunctional pathway for hydrogen formation over Pt/ZrO$_2$ catalysts," *Journal of Catalysis*, Oct. 25, 2006; 243(2): 263-9. Available online Sep. 8, 2006.

Tsapatsis et al., "EFRI-HyBi: Conversion of Biomass to Fuels using Molecular Sieve Catalysts and Millisecond Contact Time Reactors," Grant Abstract, Grant No. 0937706 [online]. National Science Foundation, project dates Sep. 1, 2009 to Aug. 31, 2013. Available online at: URL:< http://www.nsf.gov/awardsearch/showAward.do?AwardNumber=0937706>, 3 pgs. Available online Aug. 10, 2009.

Valenzuela et al., "Batch Aqueous-Phase Reforming of Woody Biomass," *Energy & Fuels*, 2006; 20(4): 1744-52. Available online Jun. 22, 2006.

Viruela-Martin et al., "Ab-initio molecular orbital calculations of the protonation reaction of propylene and isobutene by acidic Oh groups of isomorphously substituted zeolites," *J. Phys. Chem.*, Dec. 1993; 97(51): 13713-9.

Vitolo et al., "Catalytic upgrading of pyrolytic oils to fuel over different zeolites," *Fuel*, Aug. 1999; 78(10): 1147-59. Available online Jun. 17, 1999.

Vitolo et al., "Catalytic upgrading of pyrolytic oils over HZSM-5 zeolite: behaviour of the catalyst when used in repeated upgrading-regenerating cycles," *Fuel*, Jan. 2001; 80(1): 17-26. Available online Nov. 1, 2000.

Vlachos, "A Review of Multiscale Analysis: Examples from Systems Biology, Materials Engineering, and Other Fluid-Surface Interacting Systems," *Adv. Chem. Eng.*, 2005; 30: 1-61. Available online Sep. 21, 2005.

Vlachos et al., "Hierarchical multiscale model-based design of experiments, catalysts, and reactors for fuel processing," *Comp. Chem. Eng.*, 2006; 30: 1712-24. Available online Aug. 1, 2006.

Vos et al., "A Theoretical Study of the Alkylation Reaction of Toluene with Methanol Catalyzed by Acidic Mordenite," *J. Am. Chem. Soc.*, 2001; 123(12): 2799-809. Available online Mar. 2, 2001.

Wang et al., "Biomass to Hydrogen via Fast Pyrolysis and Catalytic Steam Reforming of the Pyrolysis Oil or its Fractions," *Ind. Eng. Chem. Res.*, 1997; 36(5): 1507-18. Available online May 5, 1997.

Weisz et al., "Catalytic production of high-grade fuel (gasoline) from biomass compounds by shape-selective catalysis," *Science*, Oct. 5, 1979; 206(4414): 57-8.

Xomeritakis et al., "Growth, microstructure, and permeation properties of supported zeolite (MFI) films and membranes prepared by secondary growth," *Chemical Engineering Science*, 1999; 54(15-16): 3521-31.

Yoon, "Organization of zeolite microcrystals for production of functional materials," *Acc. Chem. Res.*, Jan. 2007; 40(1): 29-40.

Zheng et al., "Reactivity of Alkanes on Zeolites: A Computational Study of Propane Conversion Reactions," *J. Phys. Chem. A*, 2005; 109(47): 10734-41. Available online Nov. 4, 2005.

Zones et al., "The Constraint Index test revisited: anomalies based upon new zeolite structure types," *Microporous and Mesoporous Materials*, Apr. 2000; 35-36: 31-46. Available online Apr. 6, 2000.

Zygmunt et al., "An assessment of density functional methods for studying molecular adsorption in cluster models of zeolites," *Journal of Molecular Structure: THEOCHEM*, Apr. 14, 1998; 430: 9-16.

Zygmunt et al., "Ab Initio and Density Functional Study of the Activation Barrier for Ethane Cracking in Cluster Models of Zeolite H-ZSM-5," *J. Phys. Chem. B*, 2000; 104(9): 1944-9. Available online Feb. 11, 2000.

Elliott, "Relation of Reaction Time and Temperature to Chemical Composition of Pyrolysis Oils," *Pyrolysis Oils from Biomass*, American Chemical Society, Washington, D.C., 1988, pp. 55-65.

Gayubo et al., "Deactivation of a HZSM-5 Zeolite Catalyst in the Transformation of the Aqueous Fraction of Biomass Pyrolysis Oil into Hydrocarbons," *Energy and Fuels*, 2004; 18(6): 1640-7. Available online Aug. 31, 2004.

Grant et al., "Petroleum," *Grant & Hackh's Chemical Dictionary*, 5$^{th}$ Ed., New York, NY, 1987, pp. 435-436.

Mullen et al., "Chemical Composition of Bio-oils Produced by Fast Pyrolysis of Two Energy Crops," *Energy & Fuels*, 2008; 22(3): 2104-2109. Available online Apr. 19, 2008.

"Petroleum," *Webster's New Collegiate Dictionary*, G. & C. Merriam Co., Springfield, MA, 1979, p. 851.

"Petroleum," Dictionary.com, © 2013, Retrieved on Jul. 3, 2013, Retrieved from the Internet: http://dictionary.reference.com/browse/petroleum; 3 pgs.

Prasad et al., "Multiscale Model and Informatics-Based Optimal Design of Experiments: Application to the Catalytic Decomposition of Ammonia on Ruthenium," *Ind. Eng. Chem. Res.*, 2008; 47(17): 6555-67. Available online Jul. 16, 2008.

\* cited by examiner

METHOD AND APPARATUS FOR PRODUCING A FUEL FROM A BIOMASS OR BIO-OIL

This application claims the benefit of U.S. Provisional Application No. 61/237,836, filed Aug. 28, 2009, which is incorporated herein by reference in its entirety.

GOVERNMENT FUNDING

This invention was made with government support under EFRI-0937706 awarded by the National Science Foundation. The government has certain rights in the invention.

BACKGROUND

Biomass production is broadly distributed throughout the United States, and there is an economic impasse to shipping tons of agricultural and forest products to a few large refineries. Additionally, biomass consists of a heterogeneous mix of forest and agricultural products that varies significantly in molecular makeup. Both of these challenges demand that the technology for biofuels production must be scalable and versatile.

The practical exploitation of biomass as a carbon-neutral source of fuels may require the development of small distributed production systems capable of processing solids and chemical conversion technologies that can overcome the recalcitrance of lignocellulosic biomass. While several processes for biomass utilization have been proposed, none meets the productivity, scalability, product distribution and economics for commercial implementation.

SUMMARY

In one aspect, the present disclosure provides a method of producing a fuel. In one embodiment, the method includes: contacting feed components including biomass feedstock and an alkane (e.g., methane) and/or an alcohol (e.g., ethanol) feedstock with a metal-containing catalyst (e.g., a transition metal, a noble metal, or a combination thereof) under conditions effective (e.g., catalytic partial oxidation conditions) to form a product including a bio-oil; and contacting the bio-oil containing product with at least a first zeolite thin film (e.g., comprising mesoporous zeolite crystals) under conditions effective to remove oxygen containing functional groups and provide a second product. Optionally, the second product can be contacted with at least a second zeolite thin film (e.g., comprising mesoporous zeolite crystals) under conditions effective to provide a fuel having a higher molecular weight than the second product. In certain embodiments, the method is a continuous process carried out in a single reactor under, for example, isothermal or autothermal conditions.

The biomass feedstock can be a solid fuel or a fluid fuel including a liquid and/or gas. The biomass feedstock can be a non-fossilized biomass (e.g., animal biomass, plant biomass, and/or municipal waste biomass) and/or a fossilized biomass (e.g., coal and/or petroleum). Typically, plant biomass can include starch, cellulose, hemicellulose, lignin, or a combination thereof.

In certain embodiments, the first and/or second zeolite thin films can be on a support selected from the group consisting of ceramic spheres, monoliths, membranes, and combinations thereof. In some embodiments, the support can include a ceramic foam such as an $\alpha$-$Al_2O_3$ foam. Optionally, the first and/or second zeolite thin films can include a metal-loaded zeolite.

In another aspect, the present disclosure provides a method of deoxygenating a bio-oil. The method includes: contacting a bio-oil containing product with at least a first zeolite thin film under conditions effective to remove oxygen containing functional groups.

In another aspect, the present disclosure provides another method of producing a fuel. The method includes: contacting a bio-oil containing product with at least a first zeolite thin film under conditions effective to remove oxygen containing functional groups and provide a first product. Optionally, the first product can be contacted with at least a second zeolite thin film under conditions effective to provide a fuel having a higher molecular weight than the first product.

In another aspect, the present disclosure provides a multi-stage, stratified reactor. In one embodiment, the reactor includes: an input for feed components including biomass feedstock and an alkane and/or an alcohol feedstock; a stage including one or more metal-containing catalysts for contacting the feed components to form a bio-oil; one or more stages including one or more zeolite thin films for contacting the bio-oil and optional intermediate products to form a fuel; and an output for the fuel formed.

Co-processing of biomass feedstock with alkane and/or alcohol feedstock can result in enrichment of the effective hydrogen content of fuels derived from biomass and in processes that preserve and/or increase the carbon chain length. Methods disclosed herein can include, for example, continuous depolymerization of solid biomass over metal catalysts in a volatilization zone to form bio-oils, the removal of oxygen from bio-oil in an upgrading zone over zeolitic materials, and the conversion of smaller intermediates to larger hydrocarbons via carbon-carbon bond forming reactions using alkane or alcohol co-reactants over zeolitic catalysts. The staged and stratified configuration of the reactor can enable different catalysts to be operated at optimal temperatures, and can also enable efficient energy integration, because it is possible for the entire method to be carried out in a single pipe. The use of zeolitic catalysts with multiple levels of porosity can enable facile mass transfer processes to enable the entire chemical conversion process to occur in millisecond timescales.

The practical implementation of this technology can lead to potential breakthroughs in the production of hydrocarbon fuels from solid lignocellulosic biomass without the use of expensive molecular hydrogen via a single-stage continuous and scalable, autothermal conversion process that involves co-processing biomass with alkane and/or alcohol co-reactants over multifunctional catalysts.

The presently disclosed methods do not require intermediate production of molecular hydrogen to deoxygenate biomass, because light alkanes can serve as hydrogen carriers for deoxygenation reactions. In some embodiments, the methods disclosed herein are capable of processing solid feedstock under continuous and autothermal conditions, preferably without the necessity of conditions such as high pressures and recycling. The methods disclosed herein can also enable acid-catalyzed chain growth reactions to be coupled with metal-catalyzed exothermic reactions in a single staged and/or stratified reactor configuration for the production of hydrocarbons in a single-train chemical process. The methods disclosed herein can be advantageous over existing methods, because they can enable a single-stage conversion process for the concurrent transformation of solid, lignocellulosic biomass and alcohol and/or alkane reactants to liquid fuels, while preferably eliminating one or more capital intensive processing steps along the way.

DEFINITIONS

The terms "comprises" and variations thereof do not have a limiting meaning where these terms appear in the description and claims.

As used herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "bio-oil" is intended to refer to the mixture of oxygen-containing organic compounds formed upon pyrolysis or oxidative thermal decomposition of solid and/or liquid biomass feedstock.

The terms "synthesis gas" and "syngas" are used herein interchangeably and refer to a mixture of hydrogen and carbon monoxide. Syngas can be an intermediate for the production of a wide variety of materials including, for example, synthetic fuels (e.g., natural gas, diesel, gasoline, and dimethyl ether), chemicals (e.g., alkanes and alcohols such as methanol), and fertilizers (e.g., ammonia). Syngas can also useful as a source of energy in, for example, gas engines, gas turbines, and fuel cells. Syngas may also include, for example, other materials such as water, carbon dioxide, and methane.

The above summary is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
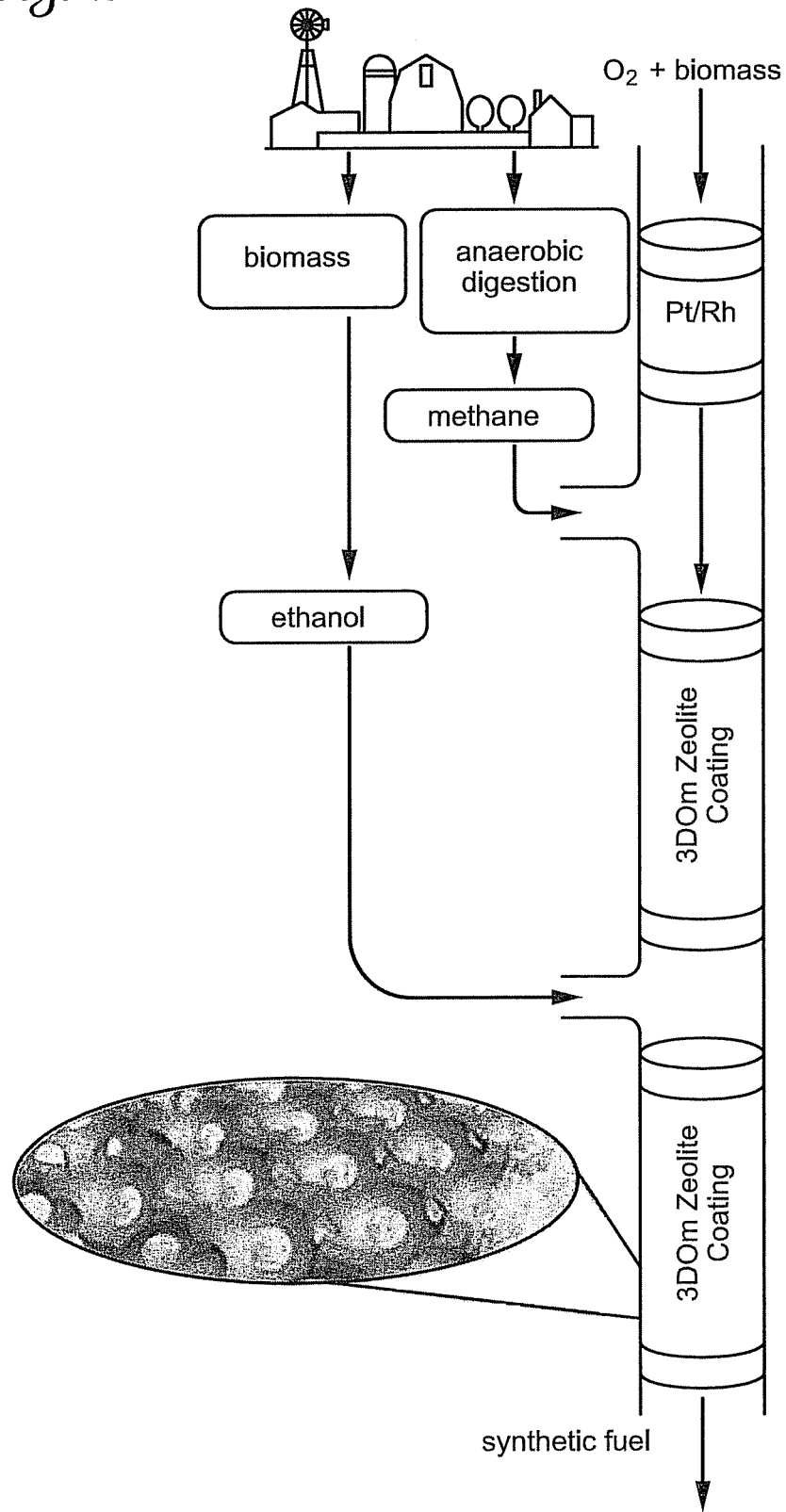
FIG. 1 is an illustration of an exemplary stratified reactor with metal on foam catalyst for biomass volatilization followed by zeolite coated monoliths for upgrading. The role of co-feed(s) and optional use of one or multiple upgrading zeolite zones is discussed herein.

At least one billion tons of lignocellulosic biomass in the form of trees, grasses and agricultural residues could be potentially used in the United States for the production of synthetic fuels on an annual basis, thereby supplanting a significant fraction of the existing demand for fossil fuels. Lignocellulose, the dominant structure in all non-food sources of biomass, consists of biopolymers in a structure that provides optimal material properties to plant structures while resisting chemical degradation. Due to these structural properties and the distributed nature of low-energy density biomass resources, small distributed systems that are very different from those used for fossil fuel conversion may be needed for the conversion of biomass to hydrocarbons. Needed chemical processing technologies may include those that can (i) be scaled down, (ii) be operated in intermittent and transient modes, (iii) handle variable feeds, and (iv) avoid conditions such as high pressures and recycle. From a chemical standpoint, the general $[-CH_2O-]_n$ stoichiometry of cellulosic biomass indicates that its conversion to hydrocarbons ([—$CH_2$—]$_n$) will involve effective removal of oxygen. Therefore, challenges in biomass-to-fuels conversion may include (i) transforming traditional large-scale chemical processing to smaller scales suitable for harnessing distributed biomass feedstock, (ii) developing a technology for processing and depolymerizing solid cellulosic feedstock to intermediate size molecules that can be further processed, and (iii) developing conversion processes that can eliminate oxygen from biomass derivatives keeping intact or increasing the carbon chain length.

While a number of processes have been proposed for biomass utilization, each has major drawbacks, e.g., (i) enzymatic conversion results in dilute streams and is slow, (ii) catalytic aqueous phase processing, although versatile, can require pre-processing and is effective only in batch processes, and typically involves the use of molecular hydrogen to facilitate deoxygenation, and (iii) catalytic upgrading in FCC type reactors using zeolites results in the loss of a significant fraction of biomass as coke.

The methods and reactors disclosed herein can preferably solve one or more of the problems discussed herein. For example, in preferred embodiments, a continuous and scalable autothermal catalytic process for the "one pot" conversion of lignocellulosic biomass to fuels over metal and zeolite-based multifunctional catalysts in a short contact time stratified reactor is provided.

Such a process has not been attempted before but feasibility of important elements of the technology are disclosed herein, including, for example: (i) the continuous char-free production of volatile organic compounds from lignocellulosic particles in a short contact time autothermal reactor; (ii) the control of mesoporosity at the nanometer level to reduce mass transfer limitations in zeolite catalysts, and (iii) the demonstration of short contact time zeolite catalysis using monolith supported thin zeolite films.

The production of fuels from biomass may be accomplished by its conversion to small fragments, the selective removal of oxygen from carbohydrates, and the conversion of small intermediates into larger hydrocarbons via carbon-carbon bond formation. Disclosed herein are methods to combine the metal-based exothermic volatilization of biomass with zeolite-based deoxygenation and C—C bond formation in millisecond contact time reactors thereby avoiding deleterious polyaromatic or solid carbonaceous by-products.

In one embodiment disclosed herein, a solution to biomass processing involves reacting biomass in a millisecond contact time autothermal reactor that can be tailored to generate either synthesis gas or pyrolysis oil depending on reactor conditions. Autothermal reactors have been shown to decompose biomass without producing coke. (Schmidt, *Green Chemistry* 10 (2008) 773-783). Additionally, autothermal reactors are capable of converting the same amount of biomass as traditional solids gasification setups while being an order of magnitude smaller. However, pyrolysis oils produced from such reactors cannot be used as a transportation fuel due to their high viscosity and instability (condensation reactions occur when pyrolysis oils are stored).

The instability of pyrolysis oil results from the hydrogen deficient, oxygen rich nature of biomass. The conversion of pyrolysis oil to transportation fuel can require the reduction of polarity and therefore the removal of oxygen and the conversion of small intermediates into larger hydrocarbons by steps involving chain growth.

To remove oxygen from pyrolysis oils, a solid acid catalyst can be placed downstream of the noble metal catalyst. The addition of an acidic second stage results in an autothermal stratified reactor system capable of handling a diverse range of biomass that will upgrade biomass to biofuels. The stratified reactor contains two sections: an initial section with a noble metal where heat generation occurs by partial oxidation and a zeolite layer downstream capable of dehydration reactions. Higher selectivity and conversions can be achieved through reactors with spatially separated catalysts. (Ramkrishna, *Chemical Engineering Science* 54 (1999) 2627-2635). In this case, spatial separation allows the zeolite layer to operate at a lower temperature, which will reduce coke formation.

In preferred embodiments disclosed herein is a continuous and scalable autothermal catalytic process for the production of hydrocarbons from biomass over metal and zeolite based multifunctional catalysts in a short-contact time, stratified reactor, as shown schematically in FIG. 1, by: (1) reactive volatilization of solid biomass over monolith-supported metal catalysts in a 'volatilization zone' to produce smaller molecules (hereafter termed bio-oil); (2) removal of oxygen containing functional groups from bio-oil in an 'upgrading zone' over zeolitic materials using alkane co-reactants as hydrogen carriers; and (3) conversion of the smaller intermediates to larger hydrocarbons via carbon-carbon bond forming reactions using alcohol (and/or alkane) co-reactants over zeolite catalysts.

The disclosed process involves the rapid and selective conversion of cellulosic biomass in autothermal millisecond contact time reactors by direct impingement of solids (and liquids) on a hot catalytic surface. (Dauenhauer et al., *Angewandte Chemie-International Edition* 2007, 46, (31), 5864-5867; Salge et al., *Science* 2006, 314, (5800), 801-804; and Deluga et al., *Science* 2004, 303, (5660), 993-997). In addition to enabling continuous char-free operation, short contact time reactors bypass the slow hydrolysis step of liquid phase processing and result in process miniaturization by more than a factor of ten. Past work has mainly focused on syngas production. Although syngas can be converted to hydrocarbons, about half the energy of the carbohydrate is typically lost in the process. Therefore, carbon chain length preservation can be desirable.

In certain embodiments, some of the methods disclosed herein can include catalytic partial oxidation, preferably under autothermal conditions. Methods of producing syngas from carbon and hydrogen-containing fuels are known in the art. See, for example, U.S. Patent Application Publication No. 2008/0237542 A1 (Schmidt et al.) and PCT International Application Publication No. WO 2008/109129 A2 (Schmidt et al.).

Biomass Feedstock

The biomass feedstock useful for the methods described herein can be a solid fuel or a fluid fuel (e.g., a fuel that includes a liquid or a gas). The term "biomass" is intended herein to refer to any organic matter collected for use as a source of energy. Various types of non-fossilized biomass include plant biomass (defined below), animal biomass (any animal by-product, animal waste, etc.), and municipal waste biomass (residential and light commercial refuse with recyclables such as metal and glass removed). Biomass is further considered herein to include any type of carbonaceous material from a fossilized source. Fossilized biomass, therefore, can further encompass various petroleum products, including, but not limited to petroleum and coal. Animal biomass can refer to any material generated by animals. Animal biomass can include, for example, animal tissue and animal excrement.

The term "plant biomass" or "ligno-cellulosic biomass" as used herein is intended to refer to virtually any plant-derived organic matter (woody or non-woody) available for energy on a sustainable basis. "Plant-derived" necessarily includes both sexually reproductive plant parts involved in the production of seed (e.g., flower buds, flowers, fruit and seeds) and vegetative parts (e.g., leaves, roots, leaf buds and stems). Examples of such plants include, but are not limited to, corn, soybeans, cotton, wheat, rice, and algae. Plant biomass can include, but is not limited to, agricultural crop wastes and residues such as corn stover, wheat straw, rice straw, and sugar cane bagasse. Plant biomass can further include, but is not limited to, woody energy crops, wood wastes, and residues such as trees, softwood forest thinnings, barky wastes, sawdust, paper and pulp industry waste streams, and wood fiber. Examples of such trees, include, but are not limited to, hybrid poplar trees (e.g., Aspen). Additionally any type of grasses, such as switch grass, for example, have potential to be produced large-scale as another plant biomass source. For urban areas, plant biomass feedstock may include yard waste (e.g., grass clippings, leaves, tree clippings, and brush) and vegetable processing waste. Plant biomass is known to be the most prevalent form of carbohydrate available in nature. In certain embodiments, the plant biomass includes starch, cellulose, hemicellulose, lignin, or a combination thereof.

The term "carbohydrate" as used herein includes compounds produced by photosynthetic plants and include carbon, hydrogen, and oxygen, typically in an atomic ratio of 1:2:1. Carbohydrates include sugars, starches, celluloses, and gums. The terms "vegetable oil" and "animal oil" refer to oils and/or fats from vegetable or animal sources, respectively. Such oils include, for example, refined and/or unrefined oils, purified and/or unpurified oils, and used oils. "Used oils" refer to vegetable and/or animal oils that have been used in the processing of another material. A used vegetable or animal oil is typically a by-product of a separate process, such as the frying of foods. The substances "yellow grease" and "brown grease" are terms known in the art to describe two types of used oils that are differentiated by their degree of contamination (such as the amount of free fatty acids remaining in the oil after frying foods), with brown grease including a greater amount of contaminants.

Alkane and/or Alcohol Feedstock

In addition to the biomass feedstock discussed herein above, in certain embodiments the methods disclosed herein also utilize an alkane and/or alcohol feedstock. As used herein, an alkane and/or alcohol feedstock includes one or more alkanes, one or more alcohols, or a combination thereof.

Useful alkanes include, for example, $C_1$-$C_5$ alkanes such as methane, ethane, propane, butane, isobutane, pentane, isopentane, and neopentane. Preferred alkanes include methane, ethane, and combinations thereof.

Useful alcohols include, for example, $C_1$-$C_5$ alcohols such as methanol, ethanol, propanol, isopropanol, n-butanol, isobutanol, sec-butanol, tert-butanol, 2-methol-1-butanol, 2-methyl-2-butanol, 1-pentanol, 2-pentanol, 3-pentanol, isopentanol, and neopentanol. Preferred alcohols include methanol, ethanol, and combinations thereof Reactors The present invention may be carried out using any reactor apparatus which will provide the feed components at a selected temperature and at a selected flow rate to a selected catalyst heated to a selected temperature, as further described herein. Such reactor types include, but are not limited to, autothermal reactors, fluidized bed reactors, packed bed reactors, catalytic wall reactors, riser reactors, and any combination thereof. A particularly preferred reactor is one in which partial oxidation may be carried out under autothermal conditions, that is, once the catalyst has reached a pre-heat temperature, no further heat input is required and the process is driven forward by the energy released from the exothermic partial oxidation reaction.

A preferred reactor material is quartz; however any material, such as ceramic, is appropriate for use in a reactor, provided it can withstand the reaction temperatures. The reactor can be of any shape, provided contact time with the catalyst is maintained. A tube shaped reactor is preferred. Additionally, a tube shaped reactor can be of any length desired, provided catalyst contact time is maintained. Preferred tube shaped reactors are preferably at least 45 centimeters (cm) in length, and more preferably at least 55 cm in length. Preferred reactors are typically no longer than 80 cm in length. Additionally, the tube reactor can be of any convenient inner diameter, provided catalyst contact time is maintained and the reactor is able to adequately hold the catalyst. Preferred reactors of the present invention have an inner diameter of, typically, at least 18 millimeters (mm). Typically, the preferred reactors of the present invention have inner diameters of no greater than 5 cm.

Preferred reactors include multi-stage, stratified reactors. As used herein, a "multi-stage" reactor is a reactor that includes patterning of two or more catalytic stages in the same reactor vessel. As used herein, a "stratified reactor" is a reactor that includes two or more spatially layered catalytic zones that can be maintained at different temperatures. Stratified reactors can be operated in one or more modes including packed-bed mode, mixed flow mode, trickle bed mode, slurry flow mode, recycle reactor mode, and combinations thereof.

In preferred embodiments, the reactor will include a metal-containing catalyst for transforming the biomass to a bio-oil (e.g., catalytic partial oxidation) and one or more zeolite catalyst stages for removing oxygen-containing functional groups. Typically, the catalytic partial oxidation stage can be used as the heat source for further reactions at the zeolite catalyst stage or stages. Conveniently, the separation between the catalytic partial oxidation stage and the zeolite stage or stages can be used to control the temperature in the zeolite stage or stages.

In preferred embodiments, the process can use such a reactor to convert biomass into a stream of C3-C6 sugar monomers and phenylpropenyl monomers, i.e., preserving a large fraction of C—C bonds. This challenging undertaking has not been attempted before. Results are discussed herein.

In another preferred embodiment, the process can deoxygenate the bio-oil in the short contact time reactor, while preserving or increasing the chain length, over zeolite catalysts. This is an equally challenging task because the pore diffusion timescales, which affect the performance (rates and selectivity) of zeolite catalysts, are preferably made compatible with millisecond residence times while maintaining the ability to control selectivity. Results are discussed herein.

In another preferred embodiment, an integrated, "one pot," autothermal millisecond timescale reactor is provided that combines the upstream processing of solid cellulosic biomass via reactive volatilization with the downstream upgrading via zeolite catalysis.

The stratified reactor configuration can enable (i) multiple catalyst zones to operate at different temperature and concentration conditions optimized for the individual catalytic sections, (ii) autothermal operation and efficient energy integration, and (iii) "one pot" processing without material or energy recycle. While such a process has not been attempted before, our data included in this disclosure demonstrates the feasibility of certain elements of the present disclosure such as: (1) continuous production of organic compounds from biomass preserving major fraction of C—C bonds, (2) manufacturing of monolith supported thin zeolitic films and of hierarchically ordered micro-/mesoporous catalysts (mesoporous zeolites) reducing mass transfer limitations and increasing catalytic activity, and (3) demonstration of chain growth reactions over a zeolite film coated monolith by co-processing of acetic acid, a model bio-oil compound, and ethanol in near millisecond contact timescales.

In certain embodiments, continuous operation of the stratified reactor can occur within the limits of the following process conditions. Values for the flux of solid feedstock through the initial stage can be, for example, 40 to 2200 kg*hr$^{-1}$*m$^{-2}$. Values for the C/O feed ratio (defined as the ratio of atomic carbon in the solid feedstock and/or methane fed to the reactor to the atomic oxygen in the co-fed molecular oxygen) can be, for example, 0.35 to 9.0. Values for the steam-to-carbon feed ratio (defined as the ratio of molecular water fed to the reactor to atomic carbon in the solid fuel and/or methane fed to the reactor) can be, for example, 0 to 10. Values for the $CO_2$-to-carbon feed ratio (defined as the ratio of molecular carbon dioxide fed to the reactor to atomic carbon within the solid fuel and/or methane fed to the reactor) can be, for example, 0 to 10. Values for the methane-to-carbon feed ratio (defined as the ratio of molecular methane fed to the reactor to atomic carbon fed to the reactor in solid fuel) can be, for example, 0 to 20. Values for the temperature of the leading surface of the initial stage that initially contacts the solid fuel can be maintained at, for example, 400° C. to 1400° C.

Metal-Containing Catalysts

Metal-containing catalysts useful for the methods described herein include, for example, a transition metal, a noble metal, or a combination thereof. The term "metal-containing catalyst" refers to a catalyst that includes a metal, a metal-containing compound, or a metal-containing composite. In various embodiments, the metal-containing catalyst can optionally include a second metal, a second metal-containing compound, or a second metal-containing composite. The term "mixed-metal catalyst" refers to a catalyst that contains more than one metal, metal-containing compound, or metal-containing composite. The metal catalyst may be supported on another material such as a ceramic-like alumina, zirconia, or ceria support, or a zeolite-based support. The presence of a catalyst support is found with the catalyst in any embodiment that requires a catalyst support, as would be readily recognized by those skilled in the art.

A preferred catalyst of the present invention includes rhodium. Additionally, other metals and/or oxides thereof can be advantageously used in combination with rhodium. Herein, the term "metals" is understood to include metals and metalloids. These metals include those selected from Groups 2, 3, 4, 5, 6, 7, 8, 9, 10, 11, 12, 13, and 14 of the Periodic Table, using the IUPAC format which numbers the groups in the Periodic Table from 1 to 18. Preferably, the catalyst includes rhodium and/or oxide thereof, and at least one other metal and/or oxide thereof selected from the group of Ce, Pd, Pt, Ru, Rh, Ir, Os, Mg, Cu, Si, Ti, V, Zn, La, Sm, Zr, Hf, Cr, Mn, Fe, Co, Ni, Cu, Y, Sn, Sb, Re, Ag, Au, Eu, Yb, and combinations of these metals and/or oxides thereof. More preferably, the catalyst includes rhodium and/or oxide thereof, and at least one other metal and/or oxide thereof selected from the group of Ce, Pt, Pd, Ru, Ir, Al, Zr, La, and combinations of these metals and/or oxides thereof. Even more preferably, the catalyst includes rhodium and/or oxide thereof, and at least one metal and/or oxide thereof selected from the group of Ce, Al, Zr, La, and combinations of these metals and/or oxides thereof. Yet more preferably, the at least one metal and/or oxide thereof is cerium.

Preferably, rhodium is included in the catalyst in an amount of at least 10% of the total weight of the metal catalyst. Other metals, if present, are present in a total amount of preferably no greater than 90%, based on total weight of the metal catalyst. In certain embodiments, the catalyst includes a mixture of rhodium and cerium in a 50/50 weight ratio of rhodium to cerium. In other certain embodiments, the catalyst includes a mixture of rhodium and cerium in a 70/30 weight ratio of rhodium to cerium. In even other certain embodiments, the catalyst includes a mixture of rhodium and cerium in an 80/20 weight ratio of rhodium to cerium.

The source of the metal can be metal salts, such as, for example, nitrates, phosphates, sulfates, chlorides, and bromides. A preferred salt for use with rhodium is rhodium nitrate. If the desired catalyst is a mixture of metals, it is preferable that the salts are compatible. "Compatible salts" are, for instance, salts having the same anion or cation and/or salts that dissolve in the same solvent. Provision of compatible salts may advantageously be accomplished by using the same type of organometallic compound. For example, for a catalyst of rhodium and cerium, rhodium nitrate and cerium nitrate may preferably be used. If, for example, a catalyst of platinum and ruthenium is desired, a mixture of chloroplatanic acid and hexachlororuthenate may advantageously be used.

Alternatively, the metal source can be transferred on to the support using any method that will deposit or coat a metal on a catalyst support, such as, but not limited to, sputtering, evaporation, CVD deposition, for example.

In certain embodiments, the metal-containing catalyst includes a lanthanide (e.g., cerium, lanthanum, or a combination thereof). In certain embodiments, the metal-containing catalyst includes Ni, Pd, Pt, Co, Rh, Ir, Fe, Ru, Os, Cu, Ag, Au, Re, or a combination thereof. In certain embodiments, the metal-containing catalyst includes a rhodium-cerium catalyst.

Depending upon the type of reactor used, the catalyst may include a support or it may be unsupported. For catalysts including a support, preferred supports of the present invention include a monolithic carrier, that is, a carrier of the type including one or more monolithic bodies having a plurality of finely divided gas flow passages extended therethrough. Such monolithic carrier members are often referred to as "honeycomb" type carriers and are well known in the art. A preferred form of such carrier is made of a refractory, substantially inert, rigid material that is capable of maintaining its shape and a sufficient degree of mechanical strength at temperatures of, for example, 1500° C. Typically a material is selected for the support that exhibits a low thermal coefficient of expansion, good thermal shock resistance, and low thermal conductivity. Typical supports include, but are not limited to, metal monolith, metal foam, ceramic monolith, foam ceramic monolith, solid spheres, porous spheres, pellets, gauze, wires, plates, and combinations thereof.

A more preferred support of the present invention includes a ceramic foam monolith such as disclosed in U.S. Pat. No. 4,568,595 (Morris), which discloses honeycombed ceramic foams with a surface having a ceramic sintered coating closing off the cells, and U.S. Pat. No. 4,253,302 (Asano et al.), which discloses a foamed ceramic containing platinum/rhodium catalyst as an exhaust gas catalyst. The foam structure is characterized by the number of pores per linear inch (ppi). Preferred ceramic foam monoliths include those with at least 10 ppi (approximately 394 pores per meter). Preferably monoliths of the present invention include those with no greater than 100 ppi (approximately 3937 pores per meter). A more preferred ceramic foam monolith includes 80 ppi (approximately 3110 pores per meter).

Preferred supports further include supports made from metals and metal oxides selected from the group of γ-alumina and magnesium aluminum silicate (cordierite). Preferably, the monolith support is washcoated to increase the surface area of the catalyst and to reduce the pore size of the monolith, thereby not only increasing the surface area, but also decreasing the probability that a species will pass through the catalyst without reacting on the surface. The washcoat is typically applied by coating an aqueous solution of, for example γ-alumina on the monolith and allowing the aqueous solvent to evaporate off.

The biomass feedstock can be impinged onto the metal catalyst by spraying, wherein reactive flash volatilization can be carried out for 1 millisecond to 1 second, for example. The spraying can produce droplets and/or an aerosol. The spraying can be carried out, for example, by using a fuel injector, pressurized nozzle, fogger, and/or nebulizer. In some embodiments the biomass feedstock can be volatilized before contacting the surface.

Zeolite Catalysts

Figure 2:
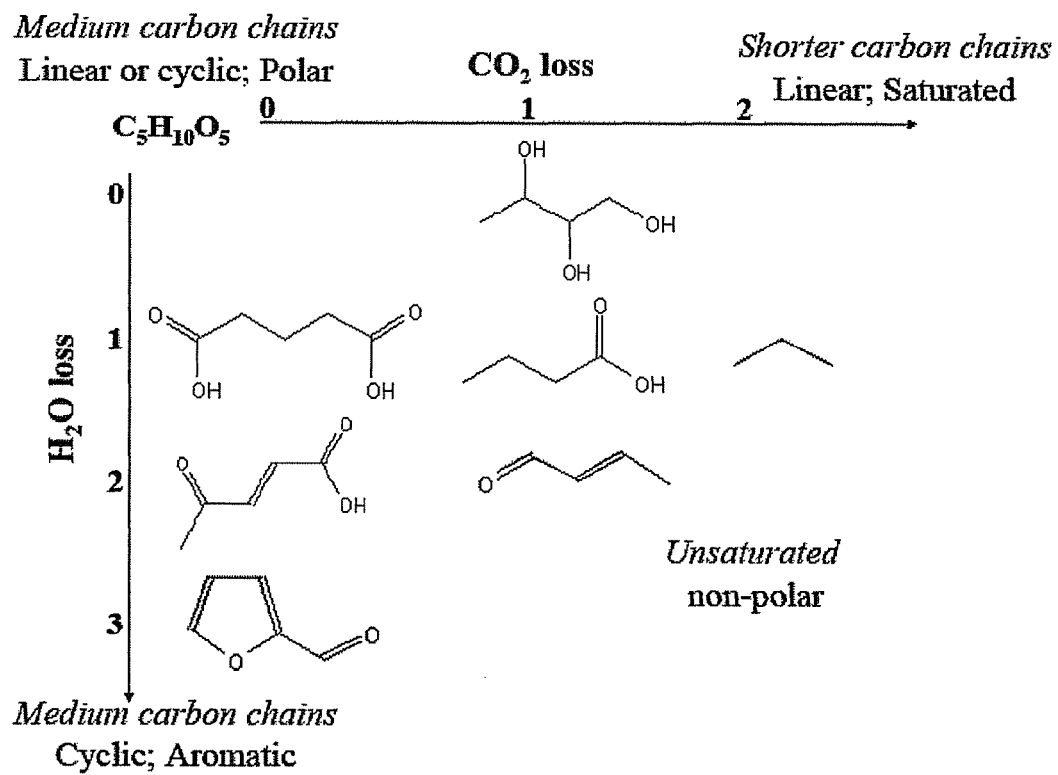
FIG. 2 is an illustration of exemplary products from dehydration and/or decarboxylation of C5 carbohydrates.

In the conversion of bio-oils to fuels, most, or all, of the oxygen atoms in the reactants are preferably removed; oxygen removal must be accompanied by isomerization to form branched hydrocarbons and C—C bond coupling reactions to increase the molecular weight of the fuel. Elimination of oxygen from biomass is highly endothermic and thermodynamically unfavorable. It can proceed via two main routes, namely the elimination of $H_2O$ and/or of $CO_2$ (FIG. 2). Elimination of $CO_2$ (decarbonylation or decarboxylation) results in saturated, linear hydrocarbons but reduces the carbon chain length rendering the product undesirable as a fuel. Elimination of $H_2O$ (dehydration) maintains the chain length but leads to progressively unsaturated, aromatic, and cyclic compounds. Since none of the schemes (FIG. 2) directly results in synthetic fuels, reduction of polarity and increase of the carbon chain length may be required. In the present disclosure, upgrading bio-oil mixtures into hydrocarbons entails addition of co-reactants before the zeolite zone(s).

Zeolite catalysts can be capable of removing oxygen from biomass via a large number of paths, including deoxygenation via dehydration, decarbonylation, or decarboxylation. In the absence of co-reactants, these catalysts can coke up. Zeolites can lead to formation of longer carbon chains in etherification, esterification, and oligomerization reactions (grouped as Steps 1, 2 and 3 in FIG. 3). Zeolites can also be capable of catalyzing hydrogen transfer and isomerization reactions.

A major challenge for the efficient upgrading to fuels is selectivity among multiple paths. This can be tackled by combining paths (to form desirable fuels) via choosing suitable co-feeds. For instance, dehydration can be combined with hydrogen transfer pathways by addition of alkanes ($CH_4$, available from anaerobic digestion) co-reactants. Decarbonylation or decarboxylation can be combined with C—C bond forming alkylation and oligomerization reactions, via addition of an alcohol ($C_2H_5OH$, available from fermentation processes) as a co-reactant (alcohols can easily form olefins when co-fed to the reactor).

In certain embodiments, the one or more zeolite thin films can be on a support selected from the group consisting of ceramic spheres, monoliths, membranes, and combinations thereof. In some embodiments, the support can include a ceramic foam such as an $\alpha$-$Al_2O_3$ foam. Optionally, the one or more zeolite thin films can include a metal-loaded zeolite.

Figure 3:
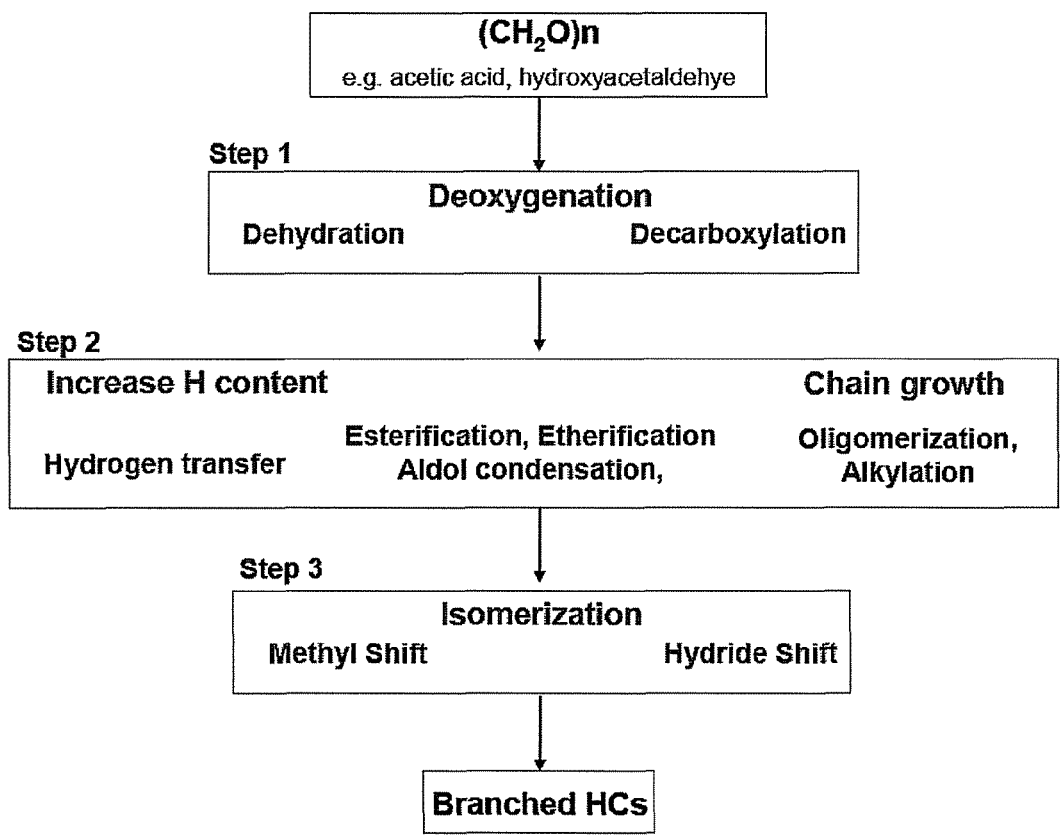
FIG. 3 illustrates an exemplary sequence of reaction steps in the conversion of biomass-derived oxygenates to hydrocarbons.

The choice of zeolite structure and composition (e.g., metal-loaded or proton-form) can be important, since it may determine the relative occurrence of certain pathways and thereby, the effluent composition. For instance, previous work has shown that only zeolites with hydroxyl groups in 8-MR channels catalyze carbonylation reactions of methyl groups, pointing to possible zeolite choices that can favor (or disfavor) decarbonylation in Step 1 (FIG. 3). (Bhan et al., *Accounts of Chemical Research* 2008, 41, (4), 559-567; Cheung et al., *Journal of Catalysis* 2007, 245, (1), 110-123; and Bhan et al., *Journal of the American Chemical Society* 2007, 129, (16), 4919-4924). Moreover, the rates of unimolecular and bimolecular reaction steps in Step 2 (FIG. 3) are significantly impacted by the zeolite structure.

A choice of alkane or alcohol co-reactants can be made, as it may determine the relative occurrence of dehydration/hydrogenation (via $CH_4$) and decarboxylation/alkylation (via alcohol addition) pathways. In certain embodiments, the method may use only one other zone (aside from the volatilization one) in the stratified reactor depending on whether deoxygenation occurs predominantly by dehydration or decarboxylation/decarbonylation. In turn, this may determine the temperature and stratification parameters as activation of the $CH_4$ co-feed can require temperatures of approximately 900 K while $C_2H_5OH$ esterification and etherification processes happen at much lower temperatures (approximately 600 K). In rare cases, three-zone stratification (one volatilization and two upgrading zones) may be used with $CH_4$ and $C_2H_5OH$ co-feed to enable both chain-growth and hydrogenation pathways.

Zeolites are porous aluminosilicates consisting of tetrahedral linked together at the corners to form a three-dimensional framework. The tetrahedral consist of a "T" atom at the center, such as silicon or aluminum, bonded to four oxygen atoms at the corners. There tetrahedra are organized in such a way as to create over 190 currently known framework types, each with a unique topology. The zeolite channel and pore dimensions are determined by ring size, which is the number of T atoms bonded together to form a ring. These pore openings consist of 6-, 8-, 9-, 10-, 12-, 14-, 18-, and 20-membered rings and can be 0.3 to 1.2 nanometers in size. Thin films of zeolite materials can be less than 500 nanometer thick sheets to several micrometer thick sheets. Thin films of zeolite materials can be self-supporting. Alternatively, or in addition to, thin films of zeolite materials can be deposited on, for example, ceramic or glass substrates (Lew et al. Accounts of Chemical Research 43 (2010) 210-219). Further examples of zeolite thin film catalyst are described in the Examples.

In preferred embodiments, the practical implementation of this technology can be performed in facilities that process 1-10 tons per day of waste agricultural residue and wood products to produce 200-2,000 gallons of liquid fuels. However, certain embodiments can be done on the bench scale process for cost and safety reasons, focusing on addressing the challenges pertaining to scale and diversity of biomass feedstock compared to petroleum processing. Although some aspects pertaining to feedstock pre-processing such as delivery, grinding, etc. are not discussed in detail herein, chemical and physical rate processes in thermochemical processing of biomass feedstock using model non-volatile liquid and solid feedstock is discussed herein.

It is worth emphasizing again that although several thermochemical routes to biomass processing have been discussed, including aqueous phase processing and fast pyrolysis, none have met the productivity and scalability properties desired for a diverse and low energy density resource like solid biomass. The present disclosure addresses these challenges.

The present invention is illustrated by the following examples. It is to be understood that the particular examples, materials, amounts, and procedures are to be interpreted broadly in accordance with the scope and spirit of the invention as set forth herein.

EXAMPLES

Example 1

Upstream Reactive Volatilization of Biomass

Figure 4:
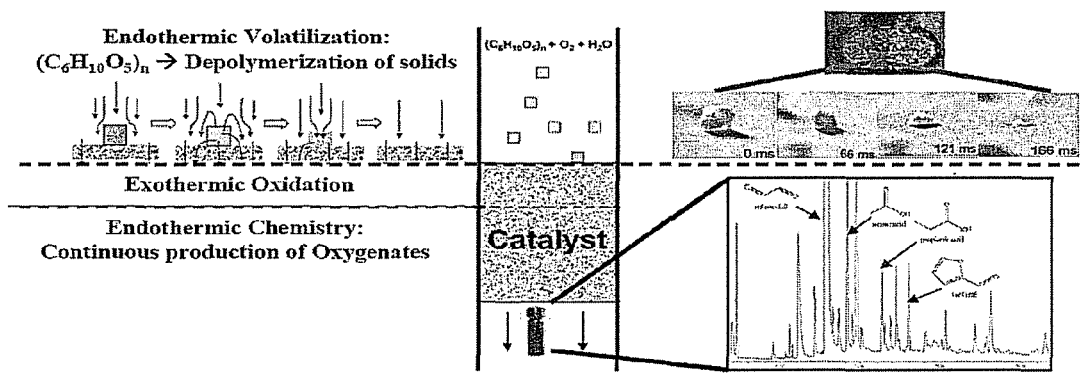
FIG. 4 is a schematic illustration of an exemplary volatilization zone. Cellulose particles can undergo rapid endothermic volatilization upon contact with a hot catalytic surface. These volatile species can flow into the catalyst bed and produce gaseous species by exothermic surface and gas phase oxidation chemistry. Illustrations of the reactor (middle), reactions (left), and photographs of the catalyst and biomass particles during volatilization with GC/MS analysis data (right) are shown.

Previously, we have shown that particles of solid biomass feedstock, including cellulose, starch, wood chips and polyethylene, directly contacting a hot Rh-based catalytic surface, maintained by heat generated from partial oxidation, undergo rapid decomposition without detectable char production to a synthesis gas stream ($CO+H_2$ mixtures) at millisecond times. (Dauenhauer et al., *Angewandte Chemie-International Edition* 2007, 46, (31), 5864-5867; and Salge et al., *Science* 2006, 314, (5800), 801-804). Autothermal operation is realized by in situ heat integration between strongly (thermally and chemically) coupled zones: (i) an endothermic evaporation/pyrolysis zone (upstream) and (ii) a reforming (downstream) zone with (iii) an exothermic oxidation zone sandwiched in the middle (FIG. 4 left schematics). The combination of these zones is what is termed the volatilization zone (FIG. 1). Experimental and modeling studies can further illustrate the fundamental chemistry and transport in these zones in detail and develop rational designs for these processes.

Figure 5:
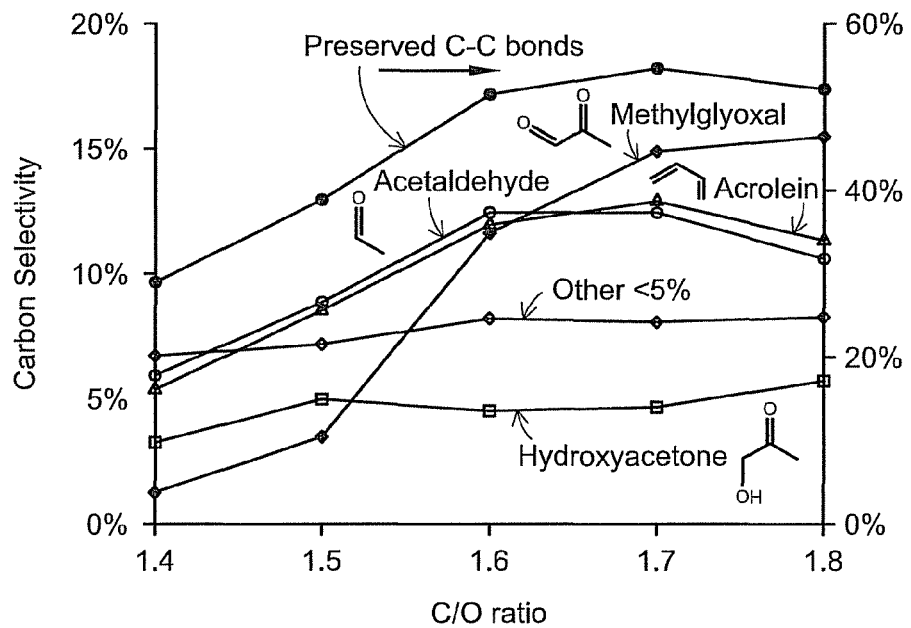
FIG. 5 is an exemplary graphical representation of glycerol conversion to bio-oil over Pt based formulations under autothermal conditions. The selectivity of the various detected products is read on the left y-axis. The top line indicates percentages of C—C bond preservation, which is read on the right y-axis.

In preferred embodiments, the process does not form syngas but, instead, depolymerizes biomass into a stream of oxygen containing organic compounds that can subsequently be upgraded over zeolite catalysts downstream. Using Rh—Ce/$Al_2O_3$ and Pt-based formulations, one can obtain a continuous effluent stream of bio-oil from cellulosic feedstock at millisecond timescales without char deposition. FIG. 4 (bottom right) indicates representative compounds identified by chromatographic and mass spectroscopic analysis of the obtained bio-oil. Given the analytical challenges involved in determining the composition of these streams and the desire to develop a fundamental understanding, glycerol can be used as a surrogate of biomass (FIG. 5). As a carbohydrate and sugar, glycerol has the same C/O ratio as cellulose and is similar to bio-oils in terms of density, viscosity and energy content. Remarkably, using a Pt (5 wt %) catalyst supported on an alumina monolith at C/O=1.7, more than 50% of the carbon in glycerol could be recovered in products with at least one C—C bond intact (FIG. 5).

In another study on Rh—Ce formulations, we have co-fed $CH_4$/cellulose/$O_2$ and noted that the front face temperature of the catalytic partial oxidation reactor (measured 40 mm downstream) is higher (approximately 1000° C.) in the presence of $CH_4$ than in its absence (approximately 800° C.). This temperature increase enhances heat transfer, enabling reactive flash volatilization of the solid biomass feedstock with stable, continuous operation. $CH_4$ co-feed provides a vehicle to tune the heat generation and distribution and possibly the bio-oil effluent composition from the volatilization zone of the reactor. Other means are discussed below.

Disclosed herein is biomass reactive flash volatilization or depolymerization via combining cutting-edge experimental and modeling methods, which enables one of skill in the art to tune the composition of bio-oil and develop design principles for scale-up of the "one pot" reactor.

Example 2

Experiments on Biomass Reactive Volatilization

The combination of volatilization of solids (depolymerization and partial oxidation) introduces a large number of variables. The process requires efficient thermal integration of endothermic volatilization with the exothermic oxidation within the catalyst bed. As part of this research, spatial profiles of temperature and composition can be measured, for the first time, along the reactor bed. In combination with modeling, we can develop fundamental understanding of the processes depicted in FIG. 4.

High-speed visualization methods can also be used to study the effects of biomass chemical identity, pellet size, etc. on char-free operation. These studies can, in turn, allow us to determine certain aspects of the mechanism by which solid biomass in contact with porous surfaces is converted to volatile species. Results with Rh—Ce formulations for cellulose decomposition at 700° C., using visualization methods with millisecond time resolution, show that cellulose thermally decomposes to a liquid intermediate with very high heat transfer rates from and to the catalytic surface, thereby, enabling continuous char-free operation (FIG. 4).

Figure 6:
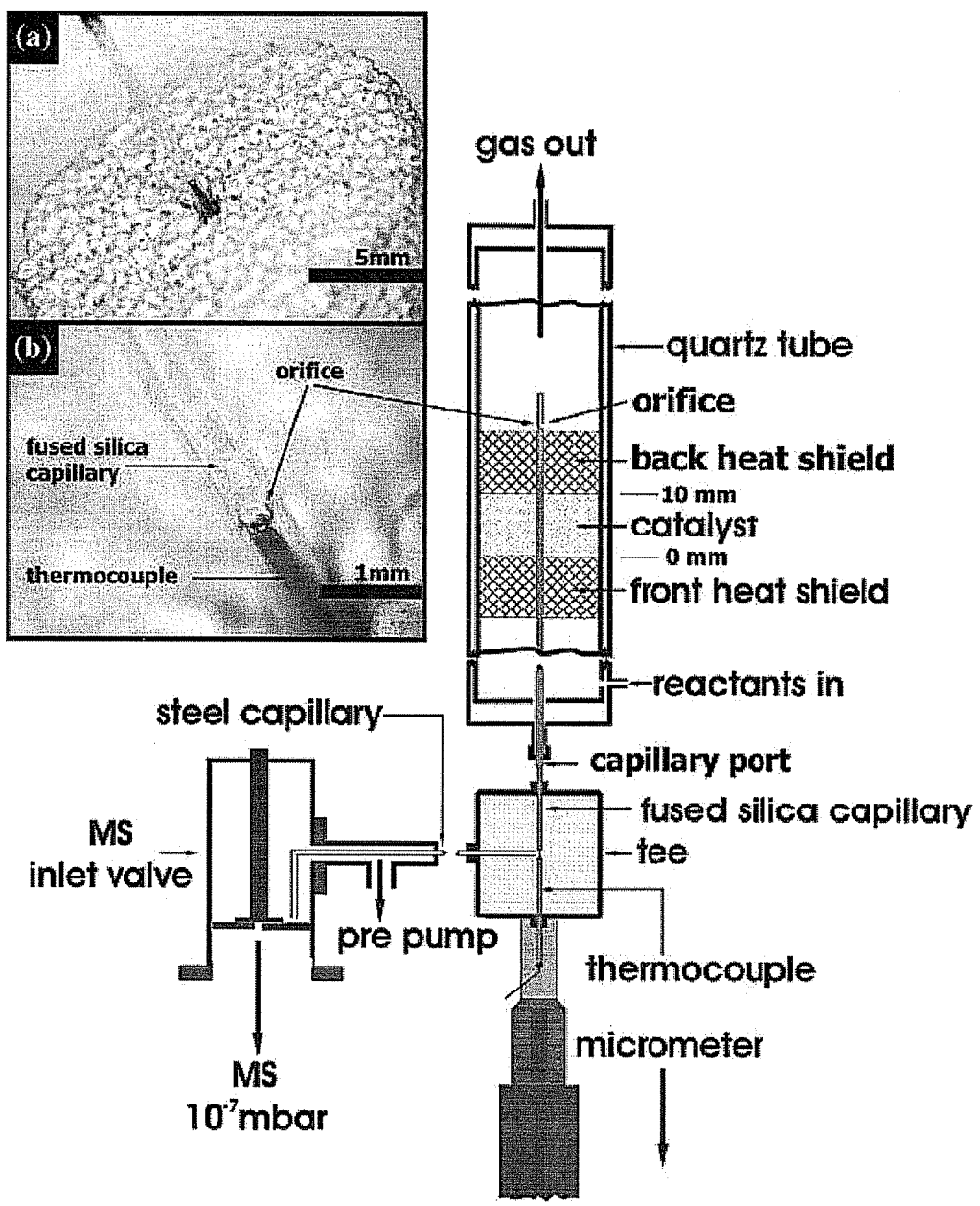
FIG. 6 is a schematic of an exemplary axial sampling apparatus. Parts (a) and (b) show photographs of an actual sampling system inserted in a monolith.

Methods to measure axial species and temperature profiles within catalytic partial oxidation foam monoliths at atmospheric pressure and approximately 0.3 mm spatial resolution using a capillary sampling technique have been reported previously for small alkanes. (Horn et al., *Catalysis Letters* 2006, 110, (3-4), 169-178; and Nogare et al., *Journal of Catalysis* 2008, 258, (1), 131-142). A schematic of the reactor and sampling technique is depicted in FIG. 6. The system allows sampling within the catalyst with negligible interference in flow or temperature using a 0.6 mm quartz capillary containing a concentric thermocouple and a 0.3 mm side orifice.

Monolith reactor configurations on which a group VIII metal (Rh, Pt or Ni) has been deposited to enable reactive flash volatilization and autothermal operation for conversion of biomass feedstock are discussed herein. We initially report using uniform feedstocks (acetic acid, glycerol, coniferyl alcohol, and cellulose) with and without $CH_4$ addition to determine the effect of feedstock composition on the rate of volatilization. By measuring the temperature and concentration profiles, we can determine the effects of varying the composition of the feed, the process C/O ratio, and biomass/$CH_4$ ratio on the composition and temperature of the effluent stream.

Example 3

Figure 7:
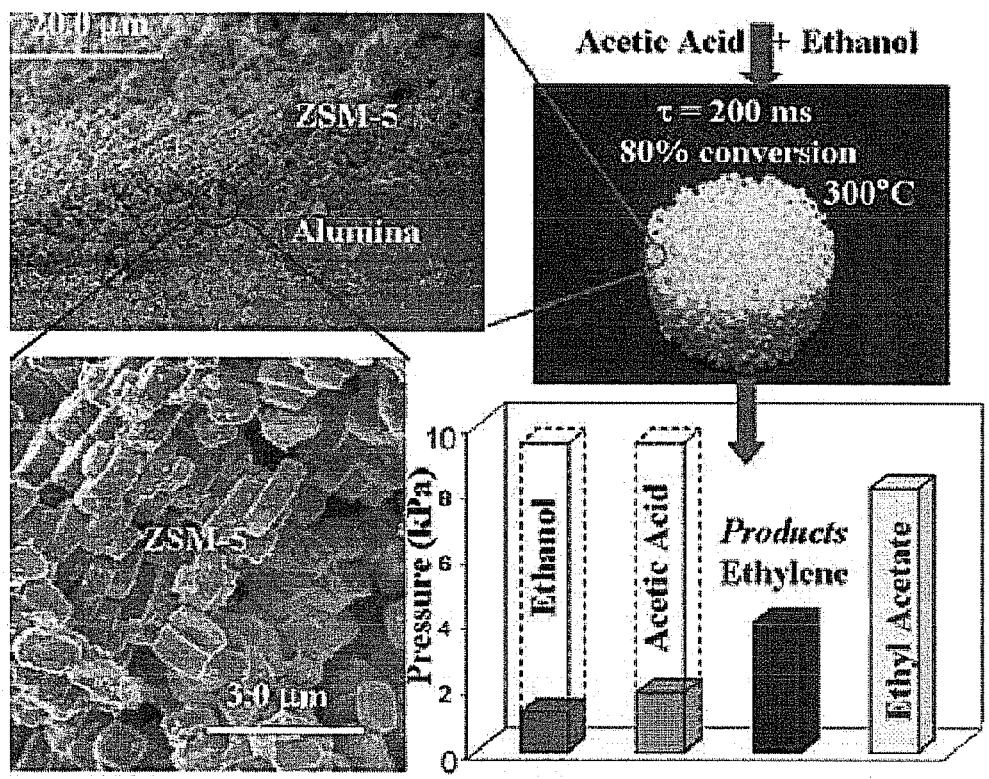
FIG. 7 includes photographic representations of an exemplary zeolite coated monolith with schematic of feed and outlet composition. SEM micrographs show the ZSM-5 zeolite deposited at two levels of magnification.

Preparing Zeolite-Based Catalysts Compatible with Millisecond Contact Time Reactors A major challenge is to make zeolite catalysis compatible with short contact times, especially for molecules diffusing slowly (e.g., with diffusivities of approximately $10^{-11}$-$10^{-13}$ $m^2$/s) in the selective but constricted environment of zeolite pores. Characteristic diffusion lengths for molecules of interest in milliseconds are in the 10-100 nm range. As a result, typical micrometer-sized zeolite catalysts can be severely underutilized and may delay the liberation of intermediate products leading to further undesirable conversions and to large reactors. We have described using thin (submicrometer to nanometer) zeolite films deposited on monoliths and foams in order to enable fast contact time zeolite catalysis downstream of the biomass volatilization zone (see FIGS. 1 and 7).

We have shown that thin zeolite films can operate with substantial conversion in short contact times. Aluminosilicate ZSM-5 zeolite films were deposited on alumina monoliths (FIG. 7) using previously developed methods. (Snyder et al., Angew. Chem. Int. Ed. 2007, 46, 7560-7573). These films were then used in a 200 ms residence time reactor to catalyze the conversion of acetic acid and ethanol to ethylene and ethyl acetate. Remarkably, stable steady state operation, with conversions in excess of 80%, was achieved at 300° C.

The reactions of acetic acid with ethanol co-feed result in the production of ethyl acetate and ethylene products via:

$$C_2H_5OH \rightarrow C_2H_4 + H_2O \quad (1)$$

$$C_2H_5OH + CH_3COOH \rightarrow CH_3COOC_2H_5 + H_2O \quad (2)$$

Our results obtained under steady-state conditions at 300° C. and 400° C. reported in Table 1 show that the relative rates of desirable bimolecular chain-growth esterification reactions (reaction 2) to that of unimolecular dehydration pathways (reaction 1) can be tuned by changing the temperature.

TABLE 1

Steady state catalytic behavior of ZSM-5 coated on Al2O3 for reactions of acetic acid (10 kPa) and ethanol (10 kPa).

|  | 300° C. | 400° C. |
| --- | --- | --- |
| Ethanol | 1.2 | 0.8 |
| Acetic Acid | 1.8 | 2.9 |
| Ethylene | 4 | 5.2 |
| Ethyl Acetate | 8.1 | 7.1 |

Data reported represent pressure in kPa of the components in the effluent.

Larger biomass derivatives may encounter increased diffusion resistances resulting in reduced apparent reaction rates. As discussed below, this issue can be addressed by constructing the zeolite catalytic films using recently discovered mesoporous zeolites (Fan et al., Nature Materials 2008, 7, 984-991) as well as pillared zeolites (Maheshwari et al., J. Am. Chem. Soc. 2008, 130, (4), 1507-1516). The added mesoporosity can provide the needed flexibility to enhance and control molecular transport to the active sites.

Example 4

Experiments on Upgrading Volatilization Products to Hydrocarbons

Bio-oil hydrodeoxygenation can be explored over carbidic forms of Mo, W, and Re encapsulated in zeolitic materials to systematically determine the effects of metal identity, bio-oil characteristics, temperature and H:O ratio. These reactions would enable hydrogen transfer and alkylation reactions in Step 2 (FIG. 3). The first zeolite we may employ is ZSM-5. Metal carbide clusters can be synthesized by exposing as-synthesized metal-oxide clusters to $CH_4$/Ar flows at temperatures similar to those used in methane pyrolysis reactions (approximately 900 K). Under these reaction conditions, metal-oxo species undergo stoichiometric reduction and carburization to form metal carbides whose presence and catalytic involvement can be inferred by measuring the evolution of oxygen as CO, $CO_2$ and $H_2O$ during an initial induction period, in which oxygen atoms are gradually removed from the metal-oxo precursors.

Figure 8:
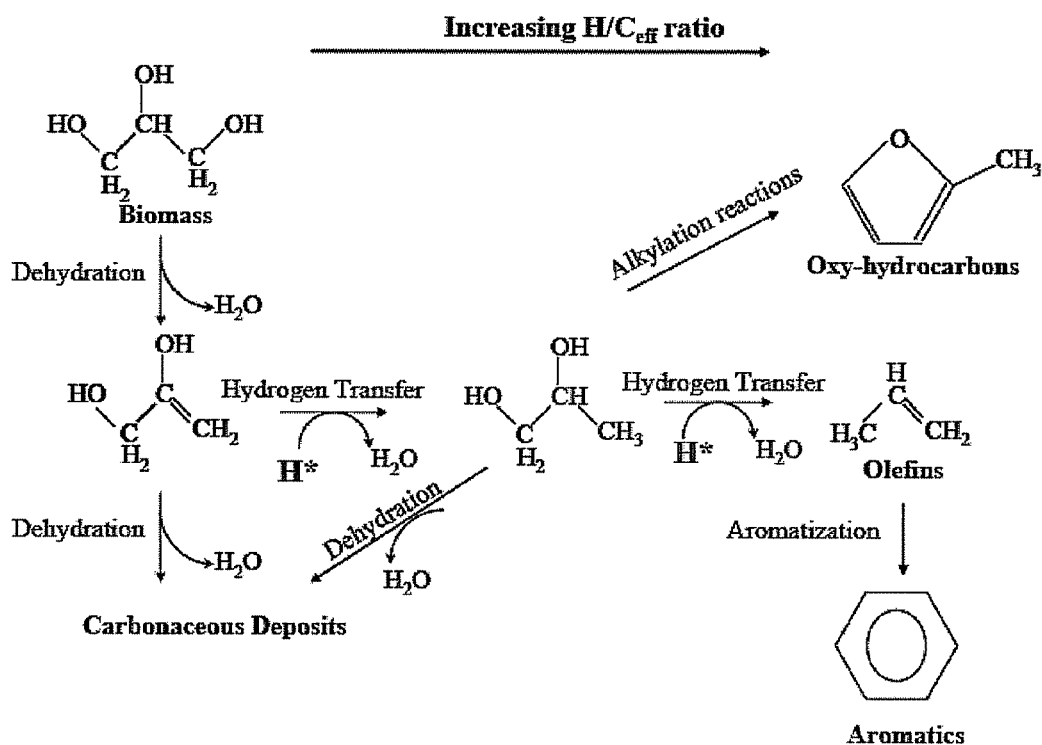
FIG. 8 illustrates exemplary reaction pathways to increase the H content and C:O ratio over zeolite catalysts (H* derived from $CH_4$).

Simple oxygenates (glycerol and acetic acid) can be initially studied as we evolve our focus towards bio-oil mixtures (FIG. 8). Kinetic isotope effects for $CH_4$ conversion using $CH_4$ and $CD_4$ can be measured to probe the kinetic relevance of $CH_4$ activation steps. Reaction pathways involved in the coupling of $CH_4$ and oxygen-containing compounds can be elucidated by monitoring the chemical and isotopic composition of products formed in reactions of $^{13}$C-labeled $CH_4$ and unlabeled oxygenate feedstock. The use of $^{13}$C labeled reactants can also allow us to identify the carbon source used to form each product and to probe the lifetimes of the adsorbed precursors. The effectiveness of $CH_4$ as a source of H* can be assessed by comparing $CH_4$ and $H_2$ co-reactants.

Example 5

Bio-Oil Upgrading with Alcohol Co-Feed

The addition of alcohol (e.g., ethanol) downstream over proton-based zeolites at temperatures of approximately 623 K for growth of the carbon chains can be studied. We emphasize again that our results on the conversion of acetic acid (a model compound for bio-oils) with ethanol co-feed using zeolite coatings on a monolith showed stable continuous millisecond contact time (approximately 200 milliseconds) operation for several hours unlike recent reports that showed extensive coking when using zeolites in the absence of an alcohol/alkane co-feed. Steady state kinetic studies and chemical and isotopic probes in transient reaction studies can again be performed to unravel the pathways in these processes and enable us to design better catalysts.

The experiments described herein can also be performed with other zeolites than ZSM-5. Experiments can be performed with zeolite powders and films deposited on monoliths (see FIG. 7). Catalytic experiments with coated monoliths can also include axial profiling as described herein. Since we expect substantial differences in catalytic behavior due to the combined meso- and microporosity of 3DOm and pillared zeolites, fundamental mechanistic studies to identify reaction pathways and axial profiling measurements can also be performed for these materials supported on monoliths.

Example 6

Figure 9:
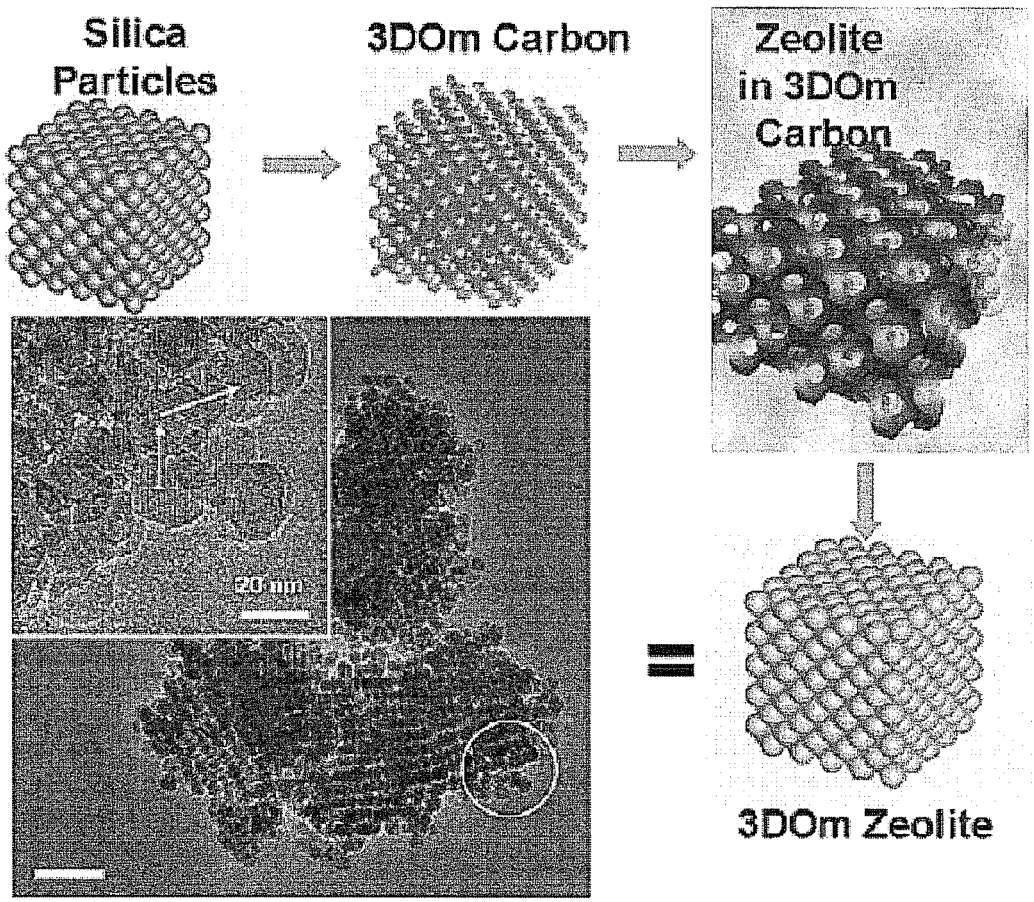
FIG. 9 is a schematic illustration of an exemplary synthesis procedure and a TEM image of a 3DOm zeolite (silicalite-1).

Zeolite Catalyst Film Design for Short Contact Time Using Mesoporous and Pillared Zeolites Our preliminary experiments were performed using compact zeolite crystals. Films consisting of zeolite particles with two levels of porosity, micro- and mesoporosity are disclosed. The crystals can be first synthesized and then they can be deposited with well-established procedures. (Yoon, Accounts of Chemical Research 2007, 40, 29-40). Methods to synthesize hierarchical zeolites that combine the zeolitic microporosity with mesopores (often precisely sized but always randomly distributed) throughout each zeolite particle have been introduced. (Christensen et al., Catalysis Today 2007, 128, 117-122). Some of these zeolites with hierarchical micro- and mesoporosity enhance transport to and from the active sites leading to higher reaction rates as well as, in one case, dramatic reduction of coke formation. Recent work shows that ordered micro-/mesoporous materials can be made by growing zeolite crystals in a three-dimensionally ordered mesoporous (3DOm) carbon scaffold (see FIG. 9). (Fan et al., Nature Materials 2008, 7, 984-991). The scaffold can be removed to create highly interconnected and precisely sized, shaped and located pores that allow for controllable and fast transport to the molecular sieve catalytic sites. Up to now the process has been demonstrated for silicalite-1, which is not catalytically active. However, in principle, any zeolite framework can be made mesoporous with this approach and the zeolitic domains can be controlled from 5 to 50 nm with precision approaching 1 nm. It is expected that 3DOm zeolites can exhibit faster reaction rates for reactions involving molecules that diffuse slowly in the zeolite pores along with reduced char formation. Moreover, they can allow to independently fine tune the catalytic activity of the meso- and micropores. For example, the acid strength in the microporous environment can be fine tuned by the choice of the zeolitic framework and Si/Al ratio while the mesoporous environment can be independently manipulated by post synthetic de-alumination or functionalization using agents that do not fit in the zeolite micropores. We propose to systematically explore the role of the micro- and mesoporous environments and their coupling on the upgrade of products of the autothermal reactor.

Figure 10:
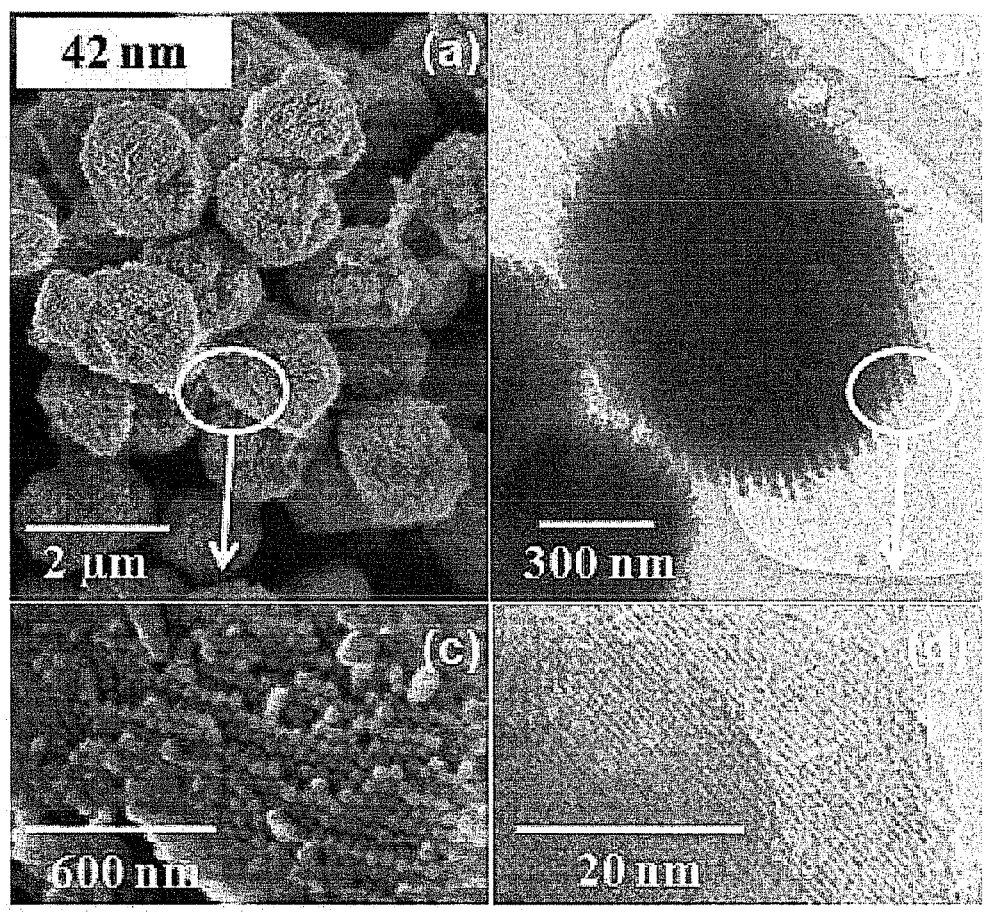
FIG. 10 illustrates scanning electron micrograph (SEM; a,c) and transmission electron micrograph (TEM; b,d) images of an exemplary zeolite (i.e., 3DOm Al-ZSM-5).

FIG. 10 shows results demonstrating that the method can be extended for the preparation of 3DOm catalytically active Al-ZSM-5. The Si/Al ratio of this sample is 25 and the zeolite domain size is 42 nanometers in size. We can initially use mesoporous Al-ZSM5 with zeolitic domain sizes of 16.5, 25, 32, and 42 nm. Recent adsorption data show that these materials have the expected zeolite microporosity and tunable mesoporosity. Moreover, solid state NMR data show that the majority of Al (>95%) is in the framework and that despite the high mesoporosity Si—OH defects are remarkably low.

In addition to 3DOm zeolites, we can also prepare catalytic coatings of exfoliated and pillared zeolites. These materials are derivatives of a certain class of layered materials that consist of microporous (zeolitic) layers. They can, in principle, be pillared by inserting silica or other oxide pillars in the spaces between the layers (often called the gallery). They can also be exfoliated to yield single zeolitic layers of nm thickness. The pillared zeolites contain tunable mesoporosity in the gallery while the single exfoliated layers allow for external surface catalysis at sites with catalytic activity similar to that of zeolite pores. It is evident that both of these types of materials are worth investigating in the context of short contact time zeolite catalysis.

A major problem with layered zeolite derivatives was that the swelling, pillaring and exfoliation procedures used, invariably, resulted in drastic alternation of the zeolitic layer. Recently, modified procedures enabled, for the first time, the layer structure preservation during exfoliation and pillaring. This has been clearly established by microscopy, adsorption, and NMR characterization. (Maheshwari et al., *J. Am. Chem. Soc.* 2008, 130, (4), 1507-1516). Moreover, data indicate that these new materials exhibit higher catalytic activity and stability compared to their earlier counterparts with partially destroyed layered structures. We can start by developing coatings of exfoliated and pillared MCM-22(P) with various Si/Al ratios and then proceed in testing other layered zeolites like RUB-18.

Example 7

Integration of Upstream and Downstream Processes to One Pot Reactor

Our data shows that bifunctional metal-based exothermic reactive flash volatilization and zeolite-based upgrading catalysts could be coupled on millisecond time scales for continuous operation. Process design and scale-up require tuning process conditions (co-feeds, flow rates) and choosing suitable reactor sizes and materials (e.g., low conductivity vs. high conductivity foams, zeolite thickness, etc.).

Our objective in this Task is to integrate the knowledge described herein in order to develop design principles for the "one pot" reactor. We can systematically examine parameters related to stratified configurations of metal and zeolite catalysts including introduction of $CH_4$ or $C_2H_5OH$ at different locations and varying concentrations. Spatial profiling techniques can be used to provide rigorous measurements of temperature and composition along the reactor bed and enable us to relate reaction temperature and concentrations to reactor performance.

Disclosed herein is a one-pot reactor for the direct conversion of lignocellulosic biomass to fuels and fuel additives. The proposed stratified reactor (FIG. 1) is ideal for multiple catalyst zones operating at different temperatures with micro-heat-exchange zones between catalysts to allow for temperature control. At the same time, this technology is a departure from existing approaches and promises to allow the needed flexibility for handling distributed and variable biomass feedstocks.

Example 8

Additional Experimental Details on the Steady State Conversion of Ethanol to Ethylene and Diethyl Ether (Parallel Reactions) at 2 SLPM Over a Zeolite Coated Monolith: Process of Synthesis of Zeolite Monolith 1. Synthesize silicalite-1 seeds (Method from De moor). Dissolve silicic acid (2.5 g) into the solution made with 7.29 g TPAOH (1M), NaOH (10M) 282 µl by heating at 90° C. for 2 hours with a composition of 2.4 TPAOH:0.44 $Na_2O$:10 $SiO_2$:114$H_2O$. After the solution becomes clear, it is transferred into Teflon container and heat at 150° C. for 24 hours. The synthesized silicalite-1 crystals solution was centrifuged at 10000 rpm for 10 min and re-dispersed in DI water. The process was repeated until the pH of the solution is down to 7. In order to check the weight concentration of the solution, 3 ml of the solution is dried at 110° C. and the final product is weighed. According the weight concentration, by adding DI water to adjust the final concentration to 4.6 wt %.

2. The pH of the silicalite-1 nanocrystals solution is adjusted to 9.5-10.0 by the addition of a 0.10 M $NH_3$ solution.

3. Clean the Al support. The surface of the fibers was cleaned at room temperature in acetone for 10 min under ultrasonicaction and, then, for 10 min in a solution with the following composition (volume parts): 5$H_2O$:$H_2O_2$:HCl ($H_2O_2$:30% in water and HCl:37%). Between the clean procedures, the support was rinsed by DI water.

4. The supports were treated for 1 hour in 1 wt % PDDA cationic polymer solution. The pH of the polymer solution is adjusted to 8 with using 0.10 M $NH_3$ solution. The supports were rinsed with 0.10 M $NH_3$ solution for 4 times to remove the excess polymer.

5. The charge-reversed supports were treated in 4.6 wt % silicalite-1 solution for 1 hour, then were rinsed with 0.10 M $NH_3$ solution for 4 times.

6. The seed coated supports were transferred to 8 ml zeolite synthesis solution made with the composition of 3 TPAOH:25 $SiO_2$:0.25 $Al_2O_3$:1.0 $Na_2O$:1450$H_2O$). The detailed procedure is described below. 0.082 g aluminum isopropoxide was dissolved into a SDA solution made by mixing 2.42 g TPAOH (1M), 160 µl NaOH (10M), 18.94 g DI $H_2O$. After the solution became completely clear, 4.16 g TEOS was added and then aging the RT for 12 hours with stirring. After 12 hours, the TEOS is completely hydrolyzed. The solution is clear. The seeded growth is performed at 150° C. for 48 hours. The zeolite coated supports were rinsed with DI water for 4 times and dried at 70° C. for 12 hours.

7. After calcination at 550° C. for 24 hours (1° C./min), the zeolite coated supports were performed for ion-exchange for 3 times in 1M NH$_4$NO$_3$ solution at 100° C. for 1 hour. Finally the supports are calcined again at 550° C. for 24 hours to form H-type zeolite coated supports.

Example 9

Experimental Setup for Short Contact Reactors for Conversion of Oxygen Containing Feedstock Over Zeolite Catalysts Ethanol was fed by an ISCO Model 500D syringe pump (0.059-1.057 ml/min flowrates) into a concentric glass nebulizer made by Precision Glassblowing along with nitrogen controlled by a mass flow controller operated by LabVIEW software (0.423-0.475 SLPM flowrates were used) where the ethanol was turned into an aerosol spray. The spray was injected into a horizontal quartz reactor tube (45.7 cm long, 2 cm inner diameter, 2.2 cm outer diameter). Additional nitrogen, if needed, was fed (also by a mass flow controller operated by LabVIEW software) into a reactor side arm at flowrates up to 1.511 SLPM.

A 45 ppi α-Al$_2$O$_3$ foam monolith (1 cm diameter, 1.7 cm long) coated with H-ZSM-5 was used. Two 0.02 inch diameter, type K thermocouples were placed at the center of the front and the back face of the monolith. The thermocouples were held in place by two uncoated 45 ppi α-Al$_2$O$_3$ foam monoliths (with the same dimensions as the coated monolith) pressed up against the front face and the back face of the catalyst. The uncoated monoliths, coated monolith, and thermocouple assembly was wrapped in ceramic cloth and inserted into the center of the reactor tube. Additionally, another uncoated 45 ppi α-Al$_2$O$_3$ foam monolith (with the same dimensions as the coated monolith) was wrapped in ceramic cloth and placed 7 cm ahead of the front face uncoated monolith to ensure proper mixing of ethanol inside the reactor tube.

A 30.5 cm long tube furnace was used to maintain isothermal operation. The tube furnace was controlled by an Omega CSC32 benchtop controller connected to the front face thermocouple. Heating tape was wrapped around the ends of the reactor tube to assist with fuel vaporization at the front of the reactor tube and to prevent reactor product condensation.

A vacuum pump was used to draw a gaseous sample into a Hewlett Packard 5890 Series II gas chromatograph containing a Plot Q column and thermal-conductivity and flame-ionization detectors used to analyze product stream composition.

During the experiment, the pump flow rate as well as the reactor temperature was allowed to stabilize, then, three separate sample injections were analyzed by the gas chromatograph before adjusting the experimental parameters. Catalyst performance has been examined for the following conditions: total flowrates of 0.5 and 2 SLPM, reactor temperatures between 150 and 300° C., and ethanol partial pressures between 2 and 22.5 kPa.

Results

Definitions Used $$\text{Conversion} = \frac{n_i \times \#C_i}{n_{ethanol} \times \#C_{ethanol}}.$$

$$\text{Selectivity} = \frac{n_i \times \#C_i}{\Sigma n_i \times \#C_i}$$

Figure 11:
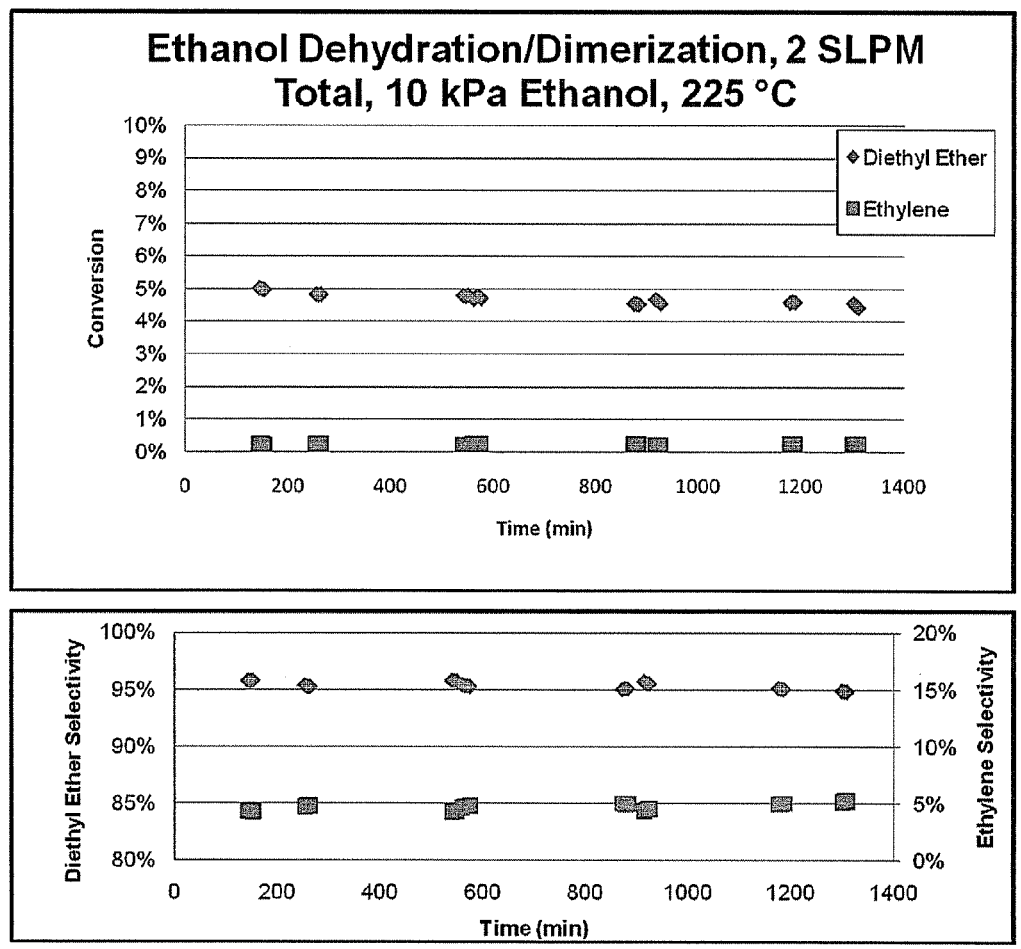
FIG. 11 is a graphical illustration of reactor performance changes over the first 22 hours of on-stream time.
Figure 12:
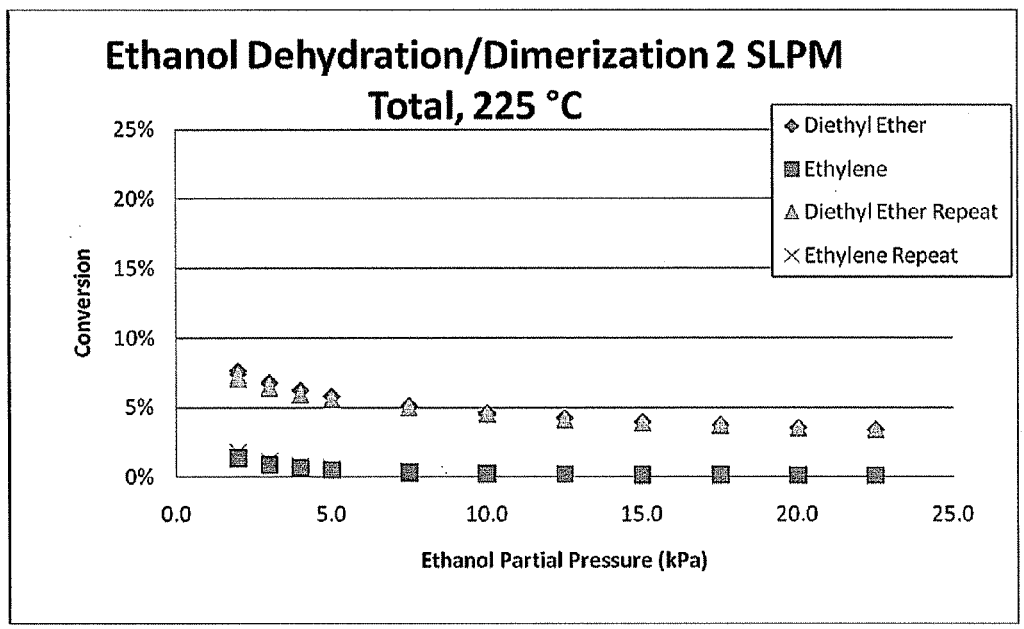
FIGS. 12-15 are graphical illustrations showing that an exemplary catalyst is capable of converting ethanol to ethylene and diethyl ether at total flowrates of 2 SLPM. Between repetitions, coke was removed by adding oxygen at high temperature as described above. At higher concentrations of ethanol, selectivity to diethyl ether increased while selectivity to ethylene decreased (FIG. 13). Ethylene and diethyl ether conversions increased with increases in temperature (FIG. 14). Temperature increase had a larger effect on ethylene conversion than diethyl ether conversion, and as a result the selectivity to ethylene increases with increasing reactor temperature (FIG. 15).
Figure 13:
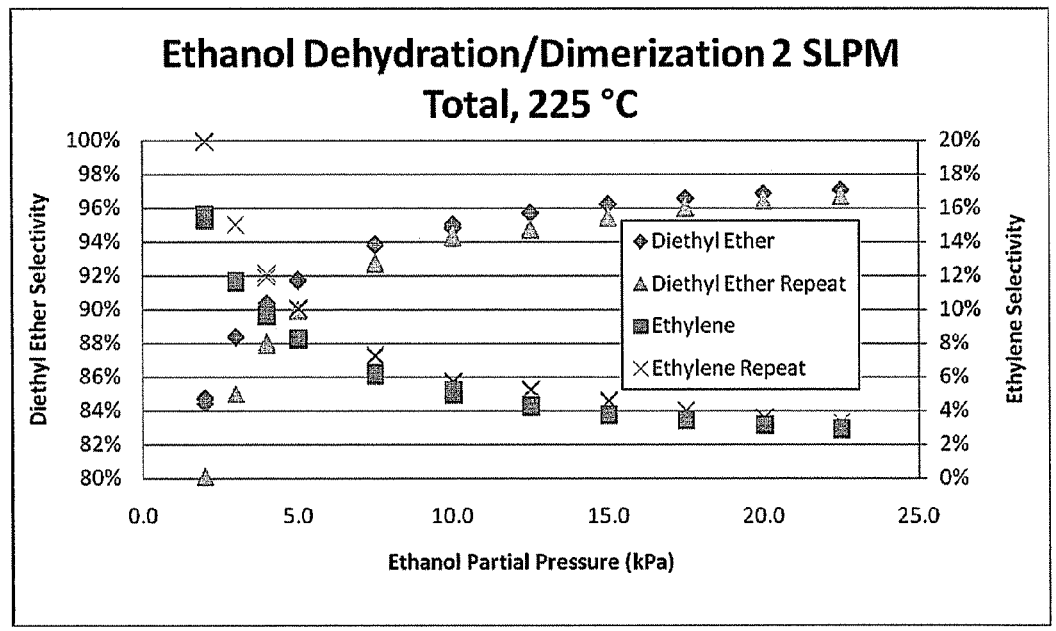

$n_i$ is the molar flowrate of product species i
$\#C_i$ is the number of carbons in a molecule of product species i
$n_{ethanol}$ is the molar flowrate of ethanol at the reactor inlet
$\#C_{ethanol}$ is the number of carbons in a molecule of ethanol A check of reactor performance at 2 SLPM total flowrate, 10 kPa partial pressure ethanol, and 225° C. was regularly performed to examine for a change in conversion and/or selectivity with on stream run time. FIG. 11 indicates that for reactor temperatures 250° C. and below, reactor performance did not degrade.

Table 2 indicates conditions that the reactor was subject to over this time span.

TABLE 2

| Reactor conditions during the first 22 hours on-stream. | | | | | |
|---|---|---|---|---|---|
| Time Frame (min) | 0-142 | 154-253 | 265-539 | 576-872 | 926-1299 |
| Reactor Temperature (° C.) | 225 | 225 | 200-250 | 150-225 | 225 |
| Partial Pressure Ethanol (kPa) | 10 | 5-15 | 10 | 10 | 2-22.5 |
| Total Flowrate (SLPM) | 2 | 0.5 | 0.5 | 2 | 2 |

For higher temperatures, coke formation was visually apparent inside the reactor, and reactor performance changed. By feeding a mixture of 10% oxygen, 90% nitrogen at 2 SLPM into the reactor held at 500° C., all coke was successfully cleaned off of the reactor and reactor performance returned to previous levels.

Figure 14:
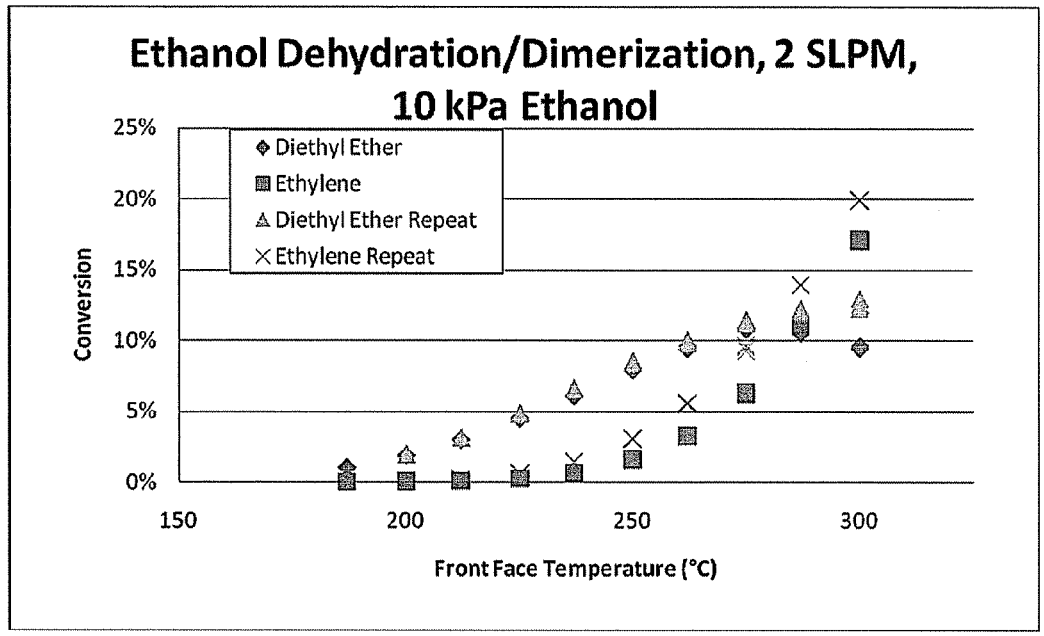
Figure 15:
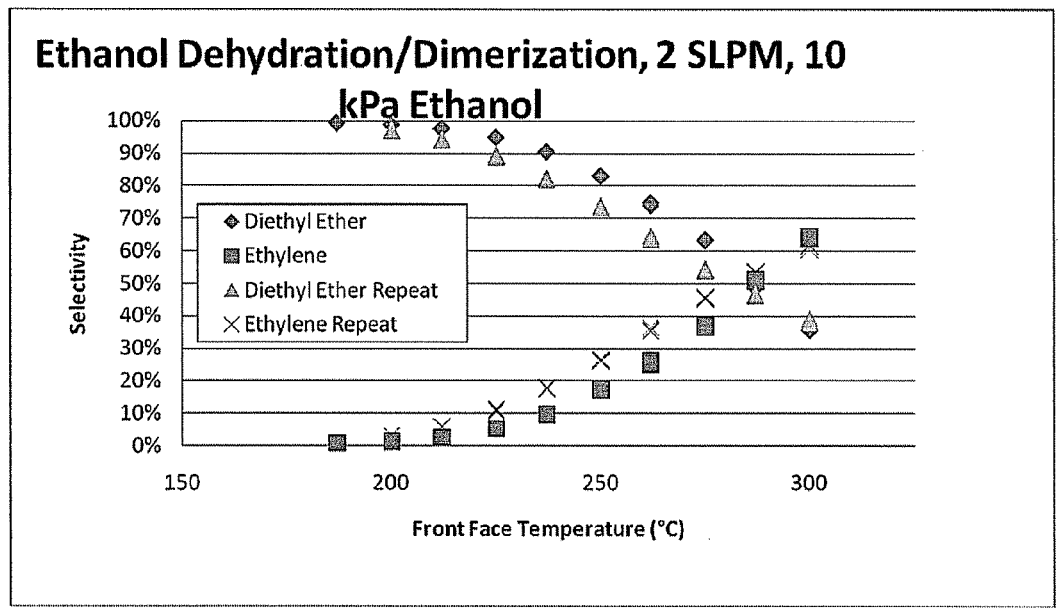

FIGS. 12-15 show that the catalyst is capable of converting ethanol to ethylene and diethyl ether at total flowrates of 2 SLPM. Between repetitions, coke was removed by adding oxygen at high temperature as described above. At higher concentrations of ethanol, selectivity to diethyl ether increased while selectivity to ethylene decreased as demonstrated in FIG. 13. FIG. 14 shows ethylene and diethyl ether conversions increasing with increases in temperature. Temperature increase had a larger effect on ethylene conversion than diethyl ether conversion, and as a result the selectivity to ethylene increases with increasing reactor temperature as shown in FIG. 15.

Example 10

Model Biomass Compound Deoxygenation by a Stratified Autothermal Reactor

Pyrolysis oils contain hundreds of molecules, which provides a large challenge for quantification experiments. Instead of feeding biomass to the reactor, a bio-oil model compound was selected. Ethanol was chosen as a model compound because it contains C—H, C—O, and O—H bonds found in biomass, and because alcohols can make up to 10% of bio-oil.

The kinetics of ethanol dehydration over zeolites has been well documented in the past including a recent study by Bhan et al. (Hsu et al., *Journal of Catalysis* 271 (2010) 251-261; and Bryant et al., *Journal of Catalysis* 8 (1967) 8-13). Autothermal ethanol partial oxidation has been studied previously by Schmidt et al. (Schmidt et al., *Science* 303 (2004) 993-997; and Schmidt et al., *Journal of Catalysis* 53 (2005) 69-78). These previous efforts are able to provide a starting point for catalyst choice and reactor design.

Typical autothermal partial oxidation reactors operate in the millisecond contact time range. By using commercially available micrometer sized zeolite catalysts downstream, diffusion limitations would result in much of the zeolite catalyst being unused. Tsapatsis et al. has previously demonstrated ZSM-5 membrane growth onto $\alpha$-$Al_2O_3$ supports. (Xomeritakis et al., *Chemical Engineering Science* 54 (1999) 3521-3531). Thin film zeolite catalysts were used in these experiments to make efficient use of reactor space.

Isothermal Operation

Ethanol was fed by an ISCO Model 500D syringe pump (0.915 ml/min flowrate) into a concentric glass nebulizer made by Precision Glassblowing along with nitrogen controlled by a mass flow controller operated by LabVIEW software (0.45 SLPM flowrate) where the ethanol was turned into an aerosol spray. The spray was injected into a horizontal quartz reactor tube (45.7 cm long, 2 cm inner diameter, 2.2 cm outer diameter). Additional nitrogen was fed into a reactor side arm so that the total flowrate was 3 SLPM.

A 45 ppi $\alpha$-$Al_2O_3$ foam monolith (1 cm diameter, 1.7 cm long) was coated with a thin film H-ZSM-5 catalyst. Two 0.02 inch diameter, type K thermocouples were placed at the center of the front and the back face of the monolith. The thermocouples were held in place by two uncoated 45 ppi $\alpha$-$Al_2O_3$ foam monoliths (with the same dimensions as the coated monolith) pressed up against the front face and the back face of the catalyst. The uncoated monoliths, coated monolith, and thermocouple assembly was wrapped in ceramic cloth and inserted into the center of the reactor tube. Additionally, another uncoated 45 ppi $\alpha$-$Al_2O_3$ foam monolith (with the same dimensions as the coated monolith) was wrapped in ceramic cloth and placed 7 cm ahead of the front face uncoated monolith to ensure proper mixing of ethanol inside the reactor tube.

A 30.5 cm long tube furnace was used to maintain isothermal operation. The tube furnace was controlled by an Omega CSC32 benchtop controller connected to the front face thermocouple. Heating tape was wrapped around the ends of the reactor tube to prevent condensation in the reactor. A vacuum pump was used to draw a gaseous sample into a Hewlett Packard 5890 Series II gas chromatograph containing a Plot Q column and thermal-conductivity and flame-ionization detectors used to analyze product stream composition.

During the experiment, the pump flow rate as well as the reactor temperature was allowed to stabilize, then, three separate sample injections were analyzed by the gas chromatograph before adjusting the experimental parameters to the next condition. Catalyst performance was examined for reactor temperatures between 300-500° C. in 50° C. temperature steps. In between each temperature step, catalyst regeneration was performed by feeding a mixture of 20% oxygen and 80% nitrogen at 0.5 SLPM into the reactor held at 500° C. for one hour.

Autothermal Operation

Ethanol, hydrogen, oxygen, and nitrogen were co-fed into the reactor. Hydrogen was used as a sacrificial fuel to generate heat. The autothermal experiments used the same total flow rate and ethanol feed rate as the isothermal experiment. A stoichiometric ratio of hydrogen and oxygen was maintained throughout the autothermal experiments. The hydrogen and oxygen was increased to raise the temperature in the reactor. Reactor performance was evaluated at ethanol:hydrogen:oxygen (E:H:O) ratios between 6.4:2:1 and 1.7:2:1. After one hour of on-stream time, three gaseous samples were taken after the noble metal layer and after the zeolite layer for all conditions. In between each E:H:O step, catalyst regeneration was performed by feeding a mixture of 20% oxygen and 80% nitrogen at 0.5 SLPM into the reactor held at 500° C. for one hour in order to remove accumulated coke, followed by feeding a mixture of 20% hydrogen and 80% nitrogen at 0.5 SLPM into the reactor held at 500° C. for one hour in order to reduce platinum.

A quartz tube the same dimensions as the reactor tube in the isothermal experiment was held vertically. A 25 cm long jacket made out of rigidized ceramic foam was used to insulate the reactor. The top of the reactor tube was wrapped in heating tape to prevent condensation near the ethanol feed.

An uncoated 45 ppi $\alpha$-$Al_2O_3$ foam monolith used to ensure mixing was placed 0.7 cm ahead of the noble metal section of the reactor. The noble metal section consisted of 2.0 g of 1.3 mm $\alpha$-$Al_2O_3$ beads coated with 1% by weight platinum mixed with 2.0 g of uncoated 1.3 mm $\alpha$-$Al_2O_3$ beads. The beads were supported by an uncoated 45 ppi $\alpha$-$Al_2O_3$ foam monolith. A 0.635 cm sampling port below the uncoated monolith was used to draw gaseous samples from directly after the noble metal section. This sampling port was kept closed by a rubber septum when not in use.

Four H-ZSM-5 coated monoliths were placed 1 cm after the uncoated monolith used to support the platinum beads. Thermocouples were placed at the top, bottom, and in between each H-ZSM-5 coated monolith as outlined in the isothermal experiment. The monolith assembly was wrapped in ceramic cloth to provide insulation and a snug fit in the reactor tube.

Catalyst Preparation

Zeolite

Silicalite-1 seeds were synthesized using the method from de Moor. (de Moor, *J. Phys Chem B* 104 (2000) 7600-7611). Silicic acid (2.5 g) was dissolved into a solution made with 7.29 g TPAOH (1M), NaOH (10M) 282 µl by heating at 90° C. for 2 hours with a composition of 2.4 TPAOH:0.44 $Na_2O$:10 $SiO_2$:114$H_2O$. After the solution became clear, it was transferred into a Teflon container and heated at 150° C. for 24 hours. The synthesized silicalite-1 crystals solution was centrifuged at 10000 rpm for 10 min and re-dispersed in DI water. The process was repeated until the pH of the solution was down to 7. In order to check the weight concentration of the solution, 3 ml of the solution was dried at 110° C. and the final product was weighed. DI water added to adjust the final concentration to 4.6 wt %. The pH of the silicalite-1 nanocrystals solution was adjusted to 9.5-10.0 by the addition of a 0.10 M $NH_3$ solution.

The surface of the fibers was cleaned at room temperature in acetone for 10 minutes under ultrasonicaction and, then, for 10 minutes in a solution with the following composition (volume parts): 5$H_2O$:$H_2O_2$:HCl ($H_2O_2$: 30% in water and HCl: 37%). Between the cleaning procedures, the support was rinsed by DI water. The supports were treated for 1 hour in 1 wt % PDDA cationic polymer solution. The pH of the polymer solution was adjusted to 8 by using a 0.10 M $NH_3$ solution. The supports were rinsed with 0.10 M $NH_3$ solution four times to remove the excess polymer. The charge-reversed supports were treated in 4.6 wt % silicalite-1 solution for 1 hour, then were rinsed with 0.10 M $NH_3$ solution four times.

The seed-coated supports were transferred to 8 ml zeolite synthesis solution made with the composition of 3 TPAOH:25 SiO$_2$:0.25 Al$_2$O$_3$:1.0 Na$_2$O:1450H$_2$O. The detailed procedure is described: 0.082 g aluminum isopropoxide was dissolved into a SDA solution made by mixing 2.42 g TPAOH (1M), 160 μl NaOH (10M), and 18.94 g DI H$_2$O. After the solution became completely clear, 4.16 g TEOS was added and aged for 12 hours with stirring. After 12 hours, the TEOS was completely hydrolyzed, and the solution was clear.

The seeded growth was performed at 150° C. for 48 hours (72 hours for the monolith used in the isothermal experiment). The zeolite coated supports were rinsed with DI water four times and dried at 70° C. for 12 hours.

After calcination at 550° C. for 24 hours (1° C./minute), the zeolite coated supports were ion-exchange 3 times in 1M NH$_4$NO$_3$ solution at 100° C. for 1 hour. Finally, the supports were calcined again at 550° C. for 24 hours to form H-type zeolite coated supports.

Platinum

Platinum was coated on 1.3 mm α-Al$_2$O$_3$ beads through incipient wetness impregnation. A solution of PtH$_2$Cl$_6$ (0.1799 g of a 13.14% wt solution) was dripped onto 2.28 g of beads, resulting in a 1% wt platinum coating. The beads were then dried overnight in a vacuum then reduced in a mixture of N$_2$ and H$_2$ at 300° C. for 3 hours.

Results and Discussion

Autothermal Processing

All oxygen was consumed in the platinum section of the stratified reactor. Over the approximately one hour time period needed for sampling, the zeolite and noble metal catalyst performance maintained operation at a steady state.

Figure 16:
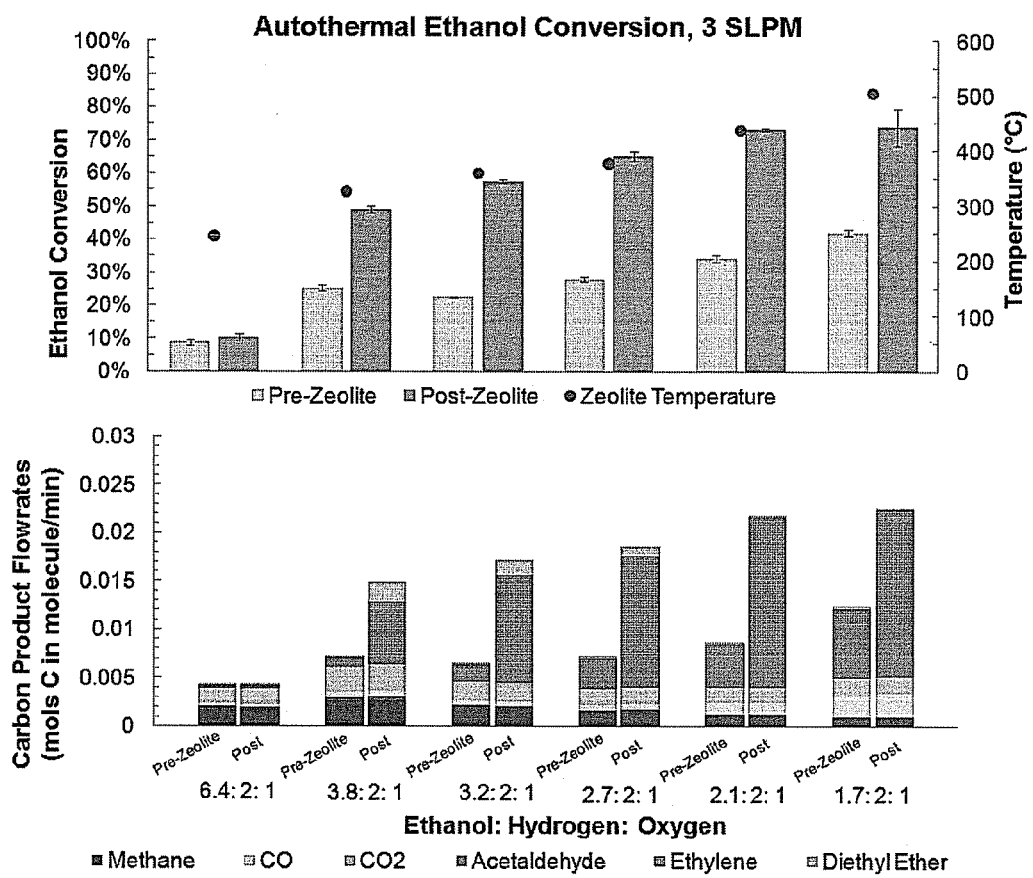
FIG. 16 illustrates that an exemplary platinum section can generate ethanol and oxidation and decomposition products (carbon monoxide, carbon dioxide, methane, and acetaldehyde) in addition to heat.

Along with heat, ethanol, and oxidation and decomposition products (carbon monoxide, carbon dioxide, methane, and acetaldehyde) were generated in the platinum section as shown in FIG. 16. In the zeolite section of the reactor, in some cases over 50% of the remaining ethanol was converted into dehydration products (ethylene and diethyl ether). The products generated in the platinum section passed through the zeolite section without reacting. Small amounts of ethylene and diethyl ether were produced in the platinum section due to the acidity of the Al$_2$O$_3$ monoliths. Conversion in both parts of the reactor increased with increasing reactor temperature, as dictated by the E:H:O ratio.

Isothermal Processing

Figure 17:
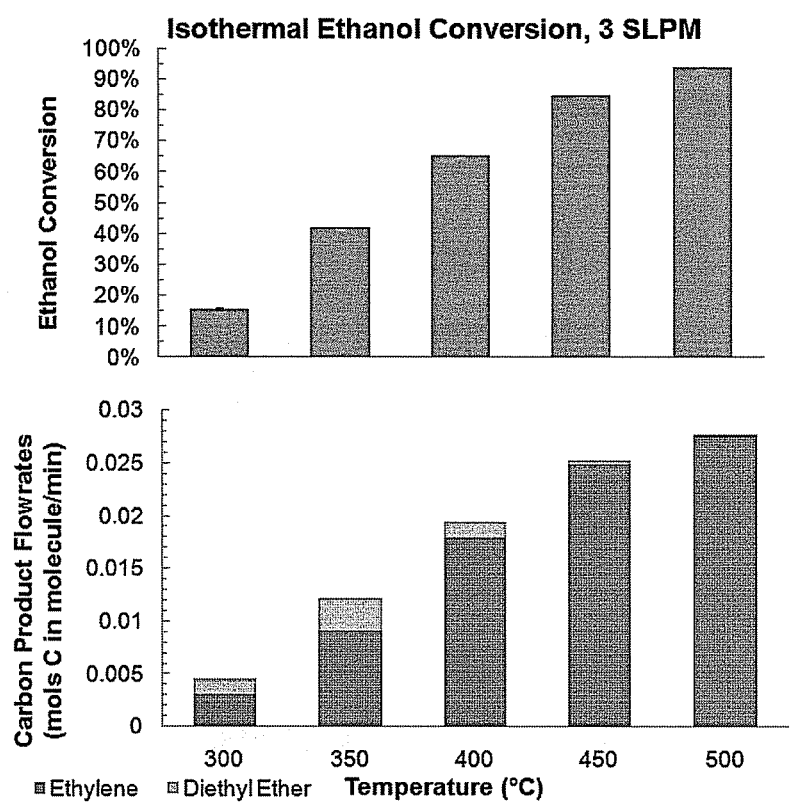
FIG. 17 is a graphical illustration showing that increasing reactor temperatures in an exemplary zeolite layer increased the yield of the unimolecular dehydration product (e.g., ethylene) faster than the yield of the bimolecular dehydration product (e.g., diethyl ether).

With increasing reactor temperatures in the zeolite layer, the yield of the unimolecular dehydration product, ethylene, increased faster than the yield of the bimolecular dehydration product, diethyl ether as shown in FIG. 17.

Near 100% selectivity to ethylene and conversions over 90 were obtained on a zeolite monolith that had a three day growth period.

TABLE 3

Autothermal ethanol conversion recorded temperatures (° C.) for the zeolite layer.

| | Ethanol:Hydrogen:Oxygen | | | | | |
|---|---|---|---|---|---|---|
| | 6.4:2:1 | 3.8:2:1 | 3.2:2:1 | 2.7:2:1 | 2.1:2:1 | 1.7:2:1 |
| Top | 264 | 360 | 407 | 432 | 502 | 571 |
| Mid-Top | 249 | 335 | 369 | 388 | 452 | 522 |
| Middle | 245 | 326 | 360 | 377 | 437 | 505 |
| Mid-Bottom | 237 | 316 | 347 | 365 | 422 | 486 |
| Bottom | 224 | 295 | 321 | 338 | 387 | 440 |

TABLE 4

Hydrogen recovery during autothermal ethanol conversion.

| | Ethanol:Hydrogen:Oxygen | | | | | |
|---|---|---|---|---|---|---|
| | 6.4:2:1 | 3.8:2:1 | 3.2:2:1 | 2.7:2:1 | 2.1:2:1 | 1.7:2:1 |
| Hydrogen Recovery | 82% | 78% | 61% | 58% | 61% | 71% |

Using this combination of catalytic partial oxidation combined with acidic dehydration, a steady state operation was achieved with zeolite temperatures ranging between 250-550° C., and total ethanol conversions reached 70%. The majority of the converted carbon was in the form of ethylene, where the ethanol carbon-carbon bonds stayed intact while the oxygen was removed.

Example 11

Figure 18:
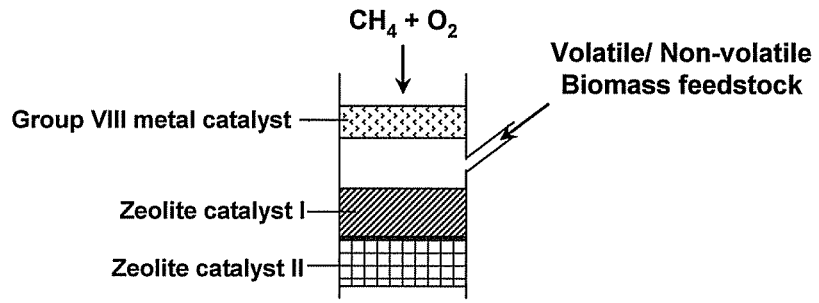
FIG. 18 is a schematic illustration showing exemplary staging and stratification reactor design parameters for co-processing biomass and natural gas.

Staging and Stratification Reactor Design Parameters for Co-Processing Biomass and Natural Gas A particular implementation of using staged reactors with metal and acidic zeolite based catalysts in short residence time reactors envisages the use of CH$_4$ and oxygen or air co-reactants upstream with a group VIII metal catalyst supported on alumina or silica monoliths or on alumina spheres to supply heat (FIG. 18). Downstream processing involves the introduction of volatile/non-volatile oxygen containing biomass feedstock which is processed over a catalyst formulation comprised of single or multiple layers of zeolite catalysts that may be used in powder form or supported as thin films (2-200 nanometers) on alumina monoliths. Zeolite catalysts of different composition and morphology can be used for downstream reactions of non-volatile biomass feedstock.

Example 12

Figure 19:
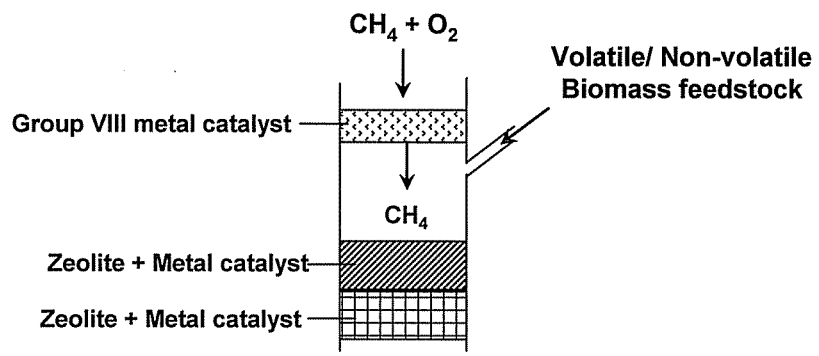
FIG. 19 is a schematic illustration showing exemplary staging and stratification reactor design parameters for co-processing biomass and natural gas using downstream metal-loaded Zeolite catalysts

Staging and Stratification Reactor Design Parameters for Co-Processing Biomass and Natural Gas Using Downstream Metal-Loaded Zeolite Catalysts A particular implementation of using staged and stratified reactor configurations for co-processing biomass and natural gas for the production of hydrocarbon fuels envisages the use of group VIII metal catalysts upstream and the use of metal-loaded (Pt, Re, W, Mo) zeolite catalysts downstream (FIG. 19). The upstream metal formulation upon exposure to CH$_4$ and air or oxygen mixtures produces the heat necessary for processing biomass feedstock downstream. A fraction of the methane fed upstream remains unconverted and reacts with oxygen containing biomass feedstock downstream in presence of single or multiple layers of zeolite and/or metal-loaded zeolite catalysts.

Example 13

Figure 20:
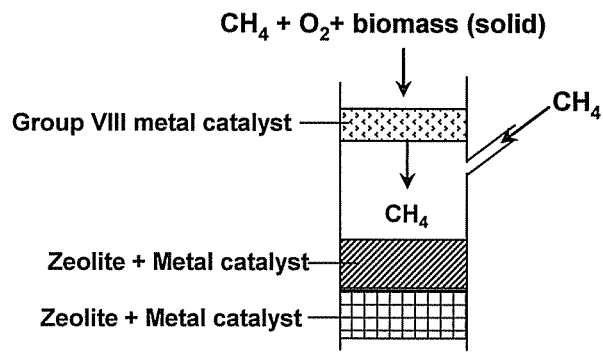
FIG. 20 is a schematic illustration showing exemplary staging and stratification reactor design parameters for co-processing biomass and natural gas with downstream natural gas co-feed.

Staging and Stratification Reactor Design Parameters for Co-Processing Biomass and Natural Gas with Downstream Natural Gas Co-Feed A particular scenario for the use of staged and stratified multi-functional catalyst formulations for co-processing biomass and natural gas in short contact time reactors envisages the use of group VIII noble metal catalysts upstream and use of mono- or bi-functional zeolite or metal-loaded (Pt, Re, Mo, W) zeolite catalyst formulations downstream (FIG. 20). The upstream processing includes oxidation of $CH_4$ and biomass in presence of air or oxygen streams to decompose solid biomass to produce bio-oil components that are co-processed with a natural gas co-feed downstream over the zeolite catalyst formulations.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of producing a fuel, the method comprising:
contacting feed components comprising a biomass feedstock and one or more of an alkane feedstock and an alcohol feedstock with a metal-containing catalyst under conditions effective to form a first product comprising a bio-oil, wherein the metal-containing catalyst comprises a metal selected from the group consisting of a transition metal, a noble metal, and combinations thereof; and
contacting the first product comprising the bio-oil with at least a first zeolite thin film under conditions effective to remove oxygen containing functional groups and provide a second product.

2. The method of claim 1 wherein the first zeolite thin film comprises mesoporous zeolite crystals.

3. The method of claim 1 further comprising:
contacting the second product with at least a second zeolite thin film under conditions effective to provide a fuel having a higher molecular weight than the second product.

4. The method of claim 3 wherein the second zeolite thin film comprises mesoporous zeolite crystals.

5. The method of claim 3 wherein the first and/or second zeolite thin films are on a support selected from the group consisting of ceramic spheres, monoliths, membranes, and combinations thereof.

6. The method of claim 3 wherein the first and/or second zeolite thin films comprise a metal-loaded zeolite.

7. The method of claim 1 wherein the method is a continuous process carried out in a single reactor.

8. The method of claim 7 wherein the method is performed under isothermal conditions.

9. The method of claim 7 wherein the method is performed under autothermal conditions.

10. The method of claim 1 wherein forming the first product comprising the bio oil comprises catalytic partial oxidation.

11. The method of claim 1 wherein the alkane feedstock comprises methane.

12. The method of claim 1 wherein the alcohol feedstock comprises ethanol.

13. The method of claim 1 wherein the biomass feedstock comprises a solid fuel.

14. The method of claim 1 wherein the biomass feedstock comprises a fluid fuel.

15. The method of claim 14 wherein the fluid fuel comprises a liquid a gas, or a combination thereof.

16. The method of claim 1 wherein the biomass feedstock comprises a non-fossilized biomass.

17. The method of claim 16 wherein the non-fossilized biomass comprises animal biomass, plant biomass, municipal waste biomass, or a combination thereof.

18. The method of claim 17 wherein the plant biomass comprises starch, cellulose, hemicellulose, lignin, or a combination thereof.

19. The method of claim 1 wherein the biomass feedstock comprises fossilized biomass.

20. The method of claim 19 wherein the fossilized biomass comprises coal and/or petroleum.

21. The method of claim 1 wherein the biomass feedstock is impinged onto the metal-containing catalyst by spraying, and reactive flash volatilization is carried out for 1 millisecond to 1 second.

22. The method of claim 21 wherein the spraying produces droplets and/or an aerosol, and the spraying is carried out by using a fuel injector, pressurized nozzle, fogger, and/or nebulizer.

23. The method of claim 1 wherein the biomass feedstock is volatilized before contacting a surface of the metal-containing catalyst.

24. The method of claim 5 wherein the support comprises a ceramic foam.

25. A method of deoxygenating a bio-oil, the method comprising:
contacting a bio-oil formed by pyrolysis or oxidative thermal decomposition of plant biomass with at least a first zeolite thin film under conditions effective to remove oxygen containing functional groups.

26. A method of producing a fuel, the method comprising:
contacting a bio-oil containing product formed by pyrolysis or oxidative thermal decomposition of plant biomass with at least a first zeolite thin film under conditions effective to remove oxygen containing functional groups and provide a first product.

27. The method of claim 26 further comprising:
contacting the first product with at least a second zeolite thin film under conditions effective to provide a fuel having a higher molecular weight than the first product.

28. A method of producing a fuel, the method comprising:
contacting feed components comprising a plant biomass feedstock and an alkane feedstock with a metal-containing catalyst under conditions effective to form a first product comprising a bio-oil, wherein the metal-containing catalyst comprises a metal selected from the group consisting of a transition metal, a noble metal, and combinations thereof; and
contacting the first product comprising the bio-oil with at least a first zeolite thin film under conditions effective to remove oxygen containing functional groups and provide a second product.

* * * * *